(12) United States Patent
Koyama et al.

(10) Patent No.: US 7,258,450 B2
(45) Date of Patent: Aug. 21, 2007

(54) PROJECTOR OPTICAL SYSTEM CONFIGURATION, OPTICAL MODULE, AND PROJECTOR, AND ALSO ELECTRONIC EQUIPMENT, VEHICLE, PROJECTION SYSTEM, AND SHOWCASE UTILIZING SUCH PROJECTOR

(75) Inventors: Jun-ichiro Koyama, Nara (JP); Yoshinao Oga, Hiroshima (JP); Hiroki Orita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 186 days.

(21) Appl. No.: 11/001,019

(22) Filed: Dec. 2, 2004

(65) Prior Publication Data

US 2005/0122487 A1  Jun. 9, 2005

(30) Foreign Application Priority Data

Dec. 4, 2003 (JP) ............................. 2003-406178
Dec. 11, 2003 (JP) ............................. 2003-413433

(51) Int. Cl.
*G03B 21/26* (2006.01)
*G03B 21/20* (2006.01)
*G02B 21/36* (2006.01)

(52) U.S. Cl. .............................. 353/94; 353/85; 353/39
(58) Field of Classification Search .................. 353/94, 353/13, 30, 39
See application file for complete search history.

(56) References Cited

U.S. PATENT DOCUMENTS

| 5,123,728 A * | 6/1992 | Gradin et al. ................. 353/78 |
| 6,220,714 B1 * | 4/2001 | Eguchi ......................... 353/122 |
| 7,052,138 B2 * | 5/2006 | Matsui .......................... 353/31 |
| 2003/0117591 A1 * | 6/2003 | Stanton ........................ 353/31 |
| 2004/0027545 A1 * | 2/2004 | Yokoyama et al. ............ 353/52 |
| 2004/0125344 A1 * | 7/2004 | Matsui .......................... 353/94 |
| 2005/0110961 A1 * | 5/2005 | Oross et al. ................. 353/119 |

FOREIGN PATENT DOCUMENTS

| CN | 2336442 Y | 9/1999 |
| CN | 1356841 A | 7/2002 |
| EP | 1363460 A2 | 11/2003 |
| JP | 2002-352768 A | 12/2002 |
| JP | 2003-121924 A | 4/2003 |

\* cited by examiner

*Primary Examiner*—Melissa Jan Koval
*Assistant Examiner*—Andrew Kong
(74) *Attorney, Agent, or Firm*—Birch, Stewart, Kolasch & Birch, LLP

(57) ABSTRACT

Multiplicities of red LED cell(s), green LED cell(s), and blue LED cell(s) are arrayed in two dimensions on a single light source substrate so as to form LED plane light source(s). First lens array(s) and second lens array(s) are disposed on side(s) of the LED plane light source(s) from which light exits. Respective lens array(s) may be provided with plurality or pluralities of lenses opposing LED cell(s). Light irradiated from LED cell(s) is, by action of respective lens(es) of first lens array(s), separately collected and is thereafter, by action of respective lens(es) of second lens array(s), separately magnified; and light exiting therefrom is combined in mutually superposed fashion at irradiation surface(s). Furthermore, respective LED cell(s) is/are made to undergo timed lighting by color. Image(s) formed by reflective liquid crystal(s) and/or DMD(s) is/are switched in conformity to such timed lighting and such image(s) is/are projected onto screen(s).

27 Claims, 14 Drawing Sheets

(a)

(b)

PROJECTOR OPTICAL SYSTEM CONFIGURATION, OPTICAL MODULE, AND PROJECTOR, AND ALSO ELECTRONIC EQUIPMENT, VEHICLE, PROJECTION SYSTEM, AND SHOWCASE UTILIZING SUCH PROJECTOR

BACKGROUND OF INVENTION

This application claims priority under 35 USC 119(a) to Patent Application No. 2003-406178 filed in Japan on 4 Dec. 2003 and to Patent Application No. 2003-413433 filed in Japan on 11 Dec. 2003, the content of both of which is hereby incorporated herein by reference in its entirety.

The present invention is related to a projector optical system configuration, optical module, and projector, and also to electronic equipment, a vehicle, a projection system, and a showcase utilizing such a projector. In particular, the present invention pertains to a strategy for achieving projector miniaturization.

Due to such phenomena as the increasing popularity of corporate presentations and the increased number of households making use of home theaters, the market for projection equipment which might serve as large-screen display apparatuses (projectors) to be used in such applications has expanded rapidly in recent years. Furthermore, there is also a great deal of research underway to apply such projectors to various other products.

As disclosed at Japanese Patent Application Publication Kokai No. 2002-352768, ordinary projectors have hitherto used super-high-pressure mercury vapor lamps as light sources. As reasons for why such lamps have come to be used as light sources therein, the fact that they have very high luminance, the fact that optical manipulation of light exiting therefrom is facilitated due to the fact that they are very close to being point light sources, and so forth, may be cited.

However, because they have employed super-high-pressure mercury vapor lamps as light sources as has been mentioned above, conventional projectors have had the following deficiencies.

Because super-high-pressure mercury vapor lamps require that high voltages (e.g., 100 V to 240 V) be applied thereto, electrical power consumption is as high as on the order of 200 W, meaning that there is a limit to the extent to which reduction in projector running cost can be achieved.

Furthermore, because super-high-pressure mercury vapor lamps reach extremely high temperatures when lit, there must be elaborate cooling equipment in order to cool the lamp. This being the case, the weight of the overall projector must be large, making carrying and transport thereof difficult. In particular, it is also the case that carrying and transport of same when lit would be impossible because of the high temperatures reached by the overall projector.

As described above, so long as super-high-pressure mercury vapor lamps have been used as light sources there has been a limit to the degree to which it has been possible to achieve reduction in projector size/weight, reduction in drive voltage, and reduction in electrical power consumption.

The present invention was conceived in light of such issues, it being an object thereof to provide a projector optical system configuration, optical module, and projector, and also electronic equipment, a vehicle, a projection system, and a showcase utilizing such a projector, such as will permit reduction in projector size/weight, reduction in drive voltage, and reduction in electrical power consumption.

SUMMARY OF INVENTION

Solution means employed by one or more embodiments of the present invention for achieving the foregoing and/or other object(s) may be a projector optical system configuration utilizing LED (light emitting diode) chips as light source(s), a single light source being made up of a plurality of LED chips, with light irradiated from individual LED chips being separately collected/magnified and being combined in superposed fashion over more or less the entirety or entireties of irradiation surface(s). Use of LED chip(s) as light source(s) permits reduction in size/weight and reduction in drive voltage, consequently making it possible to reduce electrical power consumption to a very great extent. Furthermore, in accordance with one or more embodiments of the present invention, even if there should be variation in luminance and/or color between or among respective LED chips, there will nonetheless be uniform irradiation of light, without variation in luminance and/or color, over the entire irradiation surface(s).

That is, one or more embodiments of the present invention make it possible to achieve optical system(s) permitting projection of color image(s) without nonuniformity in color and/or variation in luminance despite use of LED light source(s), and make it possible to provide a small/light-weight projector that has low drive voltage and low electrical power consumption and that can easily be carried and transported. Furthermore, such benefits bring with them the possibility of application to optical systems in a wide variety of devices other than projection equipment, making it possible to achieve increased versatility of projectors and other such equipment.

More specifically, one or more embodiments of the present invention is/are predicated upon a projector optical system configuration employing LED plane light source(s) formed such that a plurality of LED cells made up of LED chip(s) are arrayed in two dimensions. This optical system configuration may be provided with first lens array(s) and second lens array(s). First lens array(s) is/are disposed on side(s) of LED plane light source(s) from which light exits; comprise a plurality of first lens members arrayed so as to individually oppose respective LED cells; and, by action of respective first lens members, separately collect light irradiated from respective LED cells of LED plane light source(s). Furthermore, second lens array(s) is/are disposed on side(s) of the first lens array(s) from which light exits; comprise a plurality of second lens members arrayed so as to individually oppose respective first lens members of first lens array(s); by action of respective second lens members, separately magnify light received from first lens array(s); and cause light exiting the respective second lens members to be combined in mutually superposed fashion at irradiation surface(s).

Whereas LED chip luminance may be increased in the future, there is a limit to what can be done with a single LED chip. That is, although attempts may be made to increase chip size and increase the current flowing therethrough and the output therefrom, as the amount of heat generated thereby will increase there is a limit to the extent to which this can be done from a thermal design standpoint. Furthermore, it would be difficult to achieve uniform illumination over the entire irradiation surface and there would be no increase in efficiency. Accordingly, it is instead adoption of an LED plane light source which is formed such that a plurality of LED cells incorporating therewithin chip(s) fabricated in appropriate size(s) are arrayed in two dimensions that makes increased luminance possible. Moreover, plane light source miniaturization can be achieved by forming same such that a plurality of LED chips are arrayed on the same substrate. As an example of a problem with such a plane light source, the fact that differences in luminance and/or color across LED cells arrayed therein may cause occurrence of variation in luminance and/or color at respective regions within the plane light source may be cited. That is, when light from such a plane light source is used to irradiate the irradiation surface, similar variation in luminance and/or color will also be present at the irradiation surface.

Such problems are mitigated by the present solution means. To wit, two types of lens arrays are disposed on side(s) of LED plane light source(s) from which light exits so as to cause a plurality of light beams separately exiting a plurality of LED cells to be combined in mutually superposed fashion over more or less entire irradiation surface(s). By thus causing light to be combined in mutually superposed fashion at irradiation surface(s), even if there should be individual difference(s) (variation) in luminance and/or color between or among respective LED cells, there will nonetheless be uniform irradiation of light, without variation in luminance and/or color, over entire irradiation surface(s), permitting projection of images comparable to those produced using conventional super-high-pressure mercury vapor lamps. Furthermore, because the amount of heat generated by LED chip(s) is less than would be the case with super-high-pressure mercury vapor lamp(s), it is possible to achieve reduction in size of cooling equipment, permitting reduction in weight of the overall projector or other such projection equipment and facilitating carrying and transport thereof.

The following may be presented as specific examples of structure which might be employed for respective elements making up the present optical system. Firstly, sizes of at least a portion of the respective LED cells, sizes of at least a portion of the first lens members of the at least one first lens array which oppose at least a portion of the respective LED cells, and sizes of at least a portion of the second lens members of the at least one second lens array which oppose at least a portion of the first lens members of the at least one first lens array may be chosen so as to be mutually substantially identical. This makes it possible for respective light beams irradiated from respective LED cells to be separately collected/magnified by respective lens members in mutual opposition thereto, and to be accurately combined in superposed fashion at irradiation surface(s).

Furthermore, at least a portion of the respective lens members of the at least one first lens array and the at least one second lens array may be made up of lens cells comprising one or more clusters of one or more lenslets. Moreover, at the at least one first lens array, respective first lenslets making up at least a portion of the lens cells may separately collect light irradiated from at least a portion of the respective LED cells of the at least one LED plane light source. And at the at least one second lens array, respective second lenslets making up at least a portion of the lens cells may separately magnify light received from at least a portion of the first lenslets of the at least one first lens array; and at least a portion of light exiting at least a portion of the second lenslets may be combined in mutually superposed fashion at the at least one irradiation surface.

By thus subdividing respective lens members of first lens array(s) and second lens array(s) into lenslets, because light irradiated from one LED chip can be subdivided and the subdivided light then combined in superposed fashion at the same irradiation surface(s), variation in luminance and/or color at individual LED chips can be "absorbed," permitting luminance and color to be made uniform in definitive fashion at irradiation surface(s).

The following may be presented as examples of techniques for accomplishing such subdivision. In a first technique, within each of the lens cells the respective lenslets therein are made to be mutually substantially identical in size (see FIG. 3(a)). In another technique, within each of the lens cells the respective lenslets therein are made to be mutually substantially nonuniform in size, but across the respective lens cells at least one mode of subdivision is made to be mutually substantially identical; and between mutually opposing lens cells of the at least one first lens array and lens cells of the at least one second lens array, the at least one mode of subdivision is made to be mutually substantially identical (see FIG. 3(b)). In yet another technique, within each of the lens cells the respective lenslets therein are made to be mutually substantially nonuniform in size, but across the respective lens cells at least one mode of subdivision is made to be mutually substantially different; and between mutually opposing lens cells of the at least one first lens array and lens cells of the at least one second lens array, the at least one mode of subdivision is made to be mutually substantially identical (see FIG. 3(c)). Such techniques are particularly effective when there are large individual differences in brightness between or among respective LED cells.

Furthermore, if the at least one first lens array is incorporated within the at least one LED plane light source, in accompaniment to reduction in the number of components making up the optical system, this will permit simplification of assembly procedures.

As such an optical system, one in which there are red, green, and blue LED cells—these being three primary colors of light—may be used in practice. The following may be presented as specific examples of structure which might be employed in such case. Firstly, the at least one LED plane light source may be such that pluralities of red, green, and blue LED cells are each respectively arrayed in two dimensions within the same plane. Such structure might be employed, for example, where the present invention is applied to an optical system for a projector of the reflective liquid crystal type or of the micromirror type. That is, respective red, green, and blue LED cells might each be arrayed within the same plane and "timed lighting control" might be used to switch which among the three primary colors is/are respectively emitting light, in correspondence to which reflective liquid crystal(s) and/or micromirror(s) which constitute irradiation surface(s) might be controlled so as to cause projection while images of respective colors are being switched in high-speed fashion.

In an exemplary method which may be cited for adjusting brightness(es) of LED chip(s) in such case, brightnesses of at least a portion of red, green, and blue LED chips are monitored by one or more photoelectric elements; and at least one white balance is adjusted by feeding back into one or more LED drive circuits at least one signal derived from the monitoring. Specific particulars with respect to control of LED(s) might be such that brightnesses of at least a portion of red, green, and blue LED chips are controlled by adjusting one or more values of one or more currents flowing through one or more LED chips. Furthermore, at least a portion of the red, green, and blue LED chips may be capable of undergoing timed lighting; and the at least one white balance may be adjusted as a result of control of lit times of at least a portion of the red, green, and blue LED chips. In such case, projection of color image(s) onto image irradiation surface(s) (screen(s)) might be accomplished by timed lighting of respective red, green, and blue LED chip(s).

Moreover, also within the purview of the technical idea of the present invention is a projector having one or more optical system configurations according to any one of the foregoing respective solution means, the projector causing at least a portion of light exiting at least a portion of the second lens members of the second lens array to be combined in mutually superposed fashion at the at least one irradiation surface so as to project one or more images onto one or more image irradiation surfaces.

Furthermore, solution means employed by one or more embodiments of the present invention for achieving the foregoing and/or other object(s) may be a projector optical module employing one or more light sources and/or a projector equipped with one or more of such optical modules wherein a multiplicity of LED cells are arrayed on light source substrate(s) so as to form LED plane light source(s), image(s) being formed by light from LED cells of respective colors. Use of LED chip(s) as light source(s) permits reduction in size/weight and reduction in drive voltage, consequently making it possible to reduce electrical power consumption to a very great extent. Furthermore, optical module(s) in accordance with one or more embodiments of the present invention and/or projector(s) equipped with such optical module(s) eliminate the need to separate white light into respective red, green, and blue wavelengths, and eliminate the need for optical components for the purpose of such separation into respective colors. Furthermore, because LED chip(s) is/are capable of being driven at low voltage(s), it is possible to reduce electrical power consumption to a very great extent.

That is, optical module(s) in accordance with one or more embodiments of the present invention and/or projector(s) equipped with such optical module(s) may be such that a multiplicity of LED cells are arrayed on light source substrate(s) so as to form LED plane light source(s), image(s) being formed by light from LED cells of respective colors. As a result, the need to separate white light into respective red, green, and blue wavelengths may be eliminated and the need for optical components for the purpose of such separation into respective colors may be eliminated, permitting dramatic reduction in parts count and making it possible to achieve an optical module that is small and lightweight. Furthermore, because LED chip(s) is/are capable of being driven at low voltage(s), it is possible to reduce electrical power consumption to a very great extent and it is possible to achieve reduction in running cost. Moreover, because the amount of heat generated by LED chip(s) is small, there is almost no need for cooling equipment, and for this reason as well it is possible to achieve reduction in weight of the projector; and in addition, high temperatures are not reached by the overall projector. From the foregoing, it is possible to provide an optical module and a projector excelling in portability and permitting reduction in size/weight and reduction in drive voltage as well as reduction in electrical power consumption.

More specifically, the following may firstly be cited as exemplary structure where the present invention is applied to an optical system of the reflective liquid crystal or micromirror type. That is, an optical module may comprise at least one LED plane light source formed such that multiplicities of red LED cells emitting light at one or more red wavelengths, green LED cells emitting light at one or more green wavelengths, and blue LED cells emitting light at one or more blue wavelengths are each arrayed together on the same substrate; at least one timed lighting control means for causing timed lighting operation such that LED cells emitting light of the same color are switched in mutually simultaneous fashion between lit and extinguished states; and at least one image forming means for receiving light from lit LED cells and for forming one or more images in correspondence to at least one color of the light so received.

Furthermore, the following may be cited as exemplary structure where the present invention is applied to an optical system of the "three-panel liquid crystal" type. That is, an optical module may comprise at least one red LED plane light source formed such that a multiplicity of red LED cells emitting light at one or more red wavelengths are arrayed on at least one substrate; at least one red image forming means for receiving light from the at least one red LED plane light source and for forming one or more images in correspondence to at least one red color; at least one green LED plane light source formed such that a multiplicity of green LED cells emitting light at one or more green wavelengths are arrayed on at least one substrate; at least one green image forming means for receiving light from the at least one green LED plane light source and for forming one or more images in correspondence to at least one green color; at least one blue LED plane light source formed such that a multiplicity of blue LED cells emitting light at one or more blue wavelengths are arrayed on at least one substrate; at least one blue image forming means for receiving light from the at least one blue LED plane light source and for forming one or more images in correspondence to at least one blue color; and at least one image combining means for combining, in mutually superposed fashion, images formed by the respective image forming means and for forming one or more projected images.

Because with conventional devices employing super-high-pressure mercury vapor lamps it has been necessary to separate white light into respective red, green, and blue wavelengths, optical components have been necessary for the purpose of such separation into respective colors, increasing parts count and making increase in the size of the projector unavoidable. Because one or more embodiments of the present invention employ LED cell(s) as light source(s) and it is possible to directly use the colored light therefrom to form image(s), dramatic reduction in parts count is permitted and it is possible to achieve an optical module that is small and lightweight. This makes it possible to make the projector portable. Furthermore, because LED chip(s) is/are capable of being driven at low voltage(s), it is possible to reduce electrical power consumption to a very great extent and it is possible to achieve reduction in running cost. Moreover, because the amount of heat generated by LED chip(s) is small, there is almost no need for cooling equipment, and for this reason as well it is possible to achieve reduction in weight of the projector; moreover, because high temperatures are not reached by the overall projector, carrying and transport thereof are facilitated.

Because, as has been described above, LED chip(s) is/are capable of being driven at low voltage(s) and electrical power consumption is low, as power supply or supplies for same it is possible to use not only household alternating-current power supply or supplies but also secondary cell(s) and/or car battery or batteries. That is, because it is possible to make it unnecessary to connect same to a household electrical outlet or the like, portability of same is permitted.

In particular, the following may be presented as specific examples of modes of application in a projector equipped with optical module(s) constructed as described above. A first example which may be cited is electronic equipment incorporating therewithin or capable of being connected to one or more projectors, at least one image being projected from at least one of the projector or projectors toward at least one of the image irradiation surface or surfaces. In more specific terms, laptop-type personal computers, mobile telephones, handheld terminal devices (e.g., PDA=Personal Digital Assistant devices), and electronic game devices may be cited as examples of such electronic equipment.

Furthermore, also within the purview of the technical idea of the present invention is a vehicle having one or more of the foregoing projectors provided in in-vehicle fashion at at least one roof portion thereof, at least one image from at least one of the projector or projectors being projected toward at least one image irradiation surface installed within the vehicle; a vehicle having one or more in-vehicle projectors provided within at least one dashboard thereof, at least one image from at least one of the projector or projectors being projected toward at least one image irradiation surface installed within the vehicle; and a vehicle having one or more in-vehicle projectors provided within the vehicle, at least one image from at least one of the projector or projectors being projected toward at least one translucent screen which is visible from outside the vehicle.

Moreover, also within the purview of the technical idea of the present invention is a projection system in which one or more of the foregoing projectors is or are installed within one or more tents, at least one image from at least one of the projector or projectors being projected toward the fabric of at least one of the tent or tents and/or toward at least one screen provided in the fabric thereof; and a showcase at which one or more of the foregoing projectors is or are installed and having at least one image irradiation surface onto which at least one image is projected from at least one of the projector or projectors.

DESCRIPTION OF PREFERRED EMBODIMENTS

Below, embodiments of the present invention are described with reference to the drawings. Before describing specific embodiments, principles behind projection in projector optical systems associated with one or more embodiments of the present invention will first be explained.

First Type of Optical System

Figure 1:
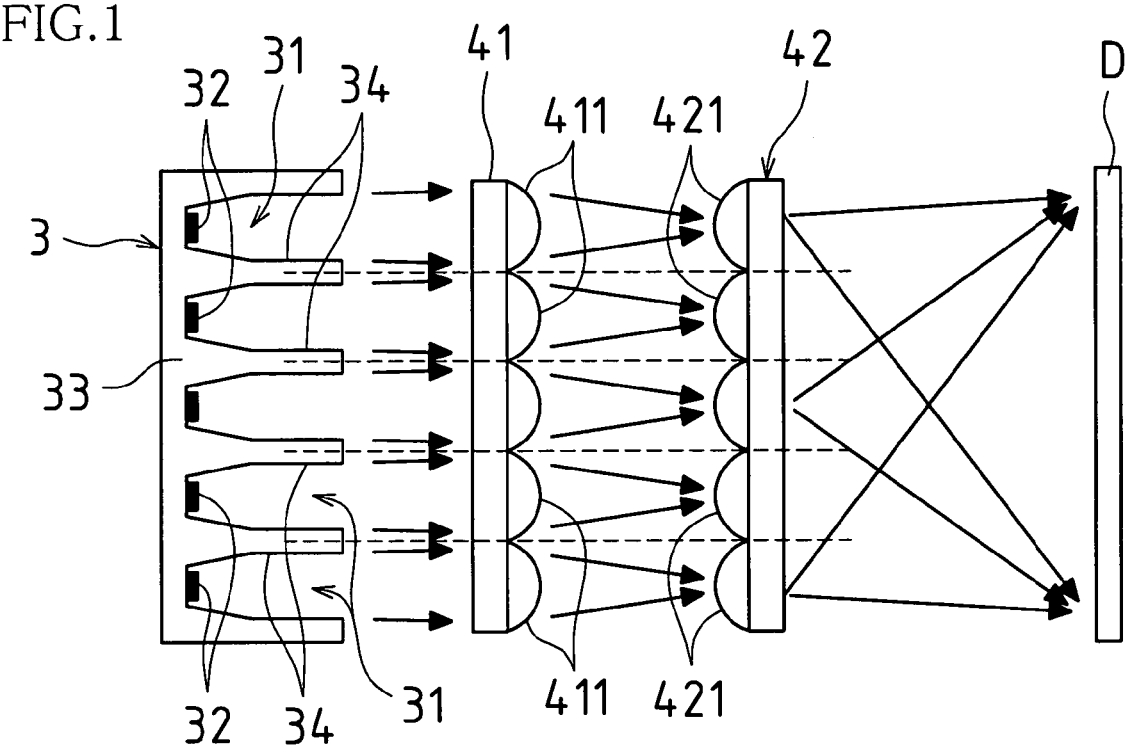
FIG. 1 is a schematic diagram showing the structure of a first type of optical module for explaining principles behind projection in an optical module.

As shown in FIG. 1, the optical system of a projector associated with the present embodiment utilizes plurality of LED chips 32, 32, . . . as light source. More specifically, the light source is made up of LED plane light source 3 in which plurality of LED chips 32, 32, . . . are arrayed horizontally and vertically after the fashion of a matrix (e.g., there might be 15 thereof in each the horizontal and the vertical direction). Respective LED chips 32, 32, . . . are arranged such that one of each thereof is individually housed within the interior of each of plurality of reflectors 34, 34 . . . which are formed in integral fashion with respect to light source substrate 33. In this way, a reflector 34 and the LED chip 32 housed therein together constitute an LED cell 31; and so, consequently, the constitution of the present LED plane light source 3 is such that plurality of LED cells 31, 31, . . . are arrayed therein in matrix fashion.

In addition, installed in front of the foregoing LED plane light source 3 (i.e., in the direction from which light exits therefrom) is first lens array 41 in which there are arranged a plurality of lenses 411, 411, . . . individually opposing respective LED cells 31, 31, . . . . Sizes of these lenses 411, 411, . . . respectively match sizes of opposing LED cells 31, 31, . . . .

Moreover, installed to the front of the foregoing first lens array 41 (i.e., in the direction from which light exits therefrom) is second lens array 42 in which there are arranged a plurality of lenses 421, 421, . . . individually opposing respective lenses 411, 411, . . . of the first lens array 41. Sizes of these lenses 421, 421, . . . respectively match sizes of opposing lenses 411, 411, . . . of first lens array 41. That is, sizes of respective LED cells 31, sizes of lenses 411 of first lens array 41 corresponding thereto, and sizes of lenses 421 of second lens array 42 in opposition thereto are chosen so as to be mutually identical.

As a result of the foregoing constitution, light exiting LED cells 31 is collected by lenses 411 of first lens array 41 in opposition thereto, and irradiates lenses 421 of second lens array 42 installed to the front thereof and in opposition thereto. In addition, the light which irradiates lenses 421 of second lens array 42 is magnified by these lenses 421, and is irradiated therefrom toward more or less the entirety of liquid crystal panel or other such irradiation surface D. Such exiting of light from LED cells 31, collection of light by lenses 411 of first lens array 41, and magnification by lenses 421 of second lens array 42 are respectively carried out through the combined action of individual LED cells 31, lenses 411, and lenses 421; as a result of which, a plurality of light beams separately exiting respective LED chips 32, 32, . . . are mutually combined in superposed fashion over more or less the entirety of irradiation surface D. This being the case, the constitution is such that even if there are individual differences (variation) in luminance and/or color between or among respective LED cells 31, 31, . . . , there will nonetheless be uniform irradiation of light, without variation in luminance and/or color, over the entire irradiation surface D.

Second Type of Optical System

Figure 2:
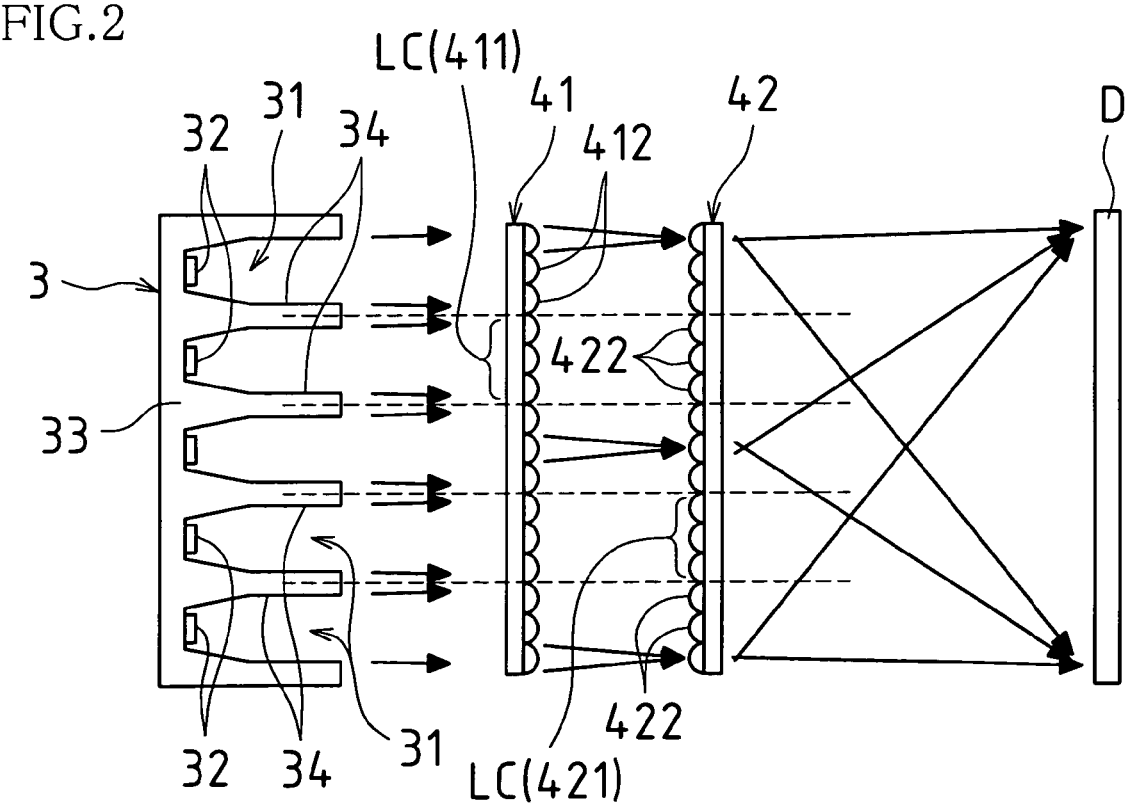
FIG. 2 is a schematic diagram showing the structure of a second type of optical module for explaining principles behind projection in an optical module.

Furthermore, the constitution shown in FIG. 2 is an improvement for definitively preventing occurrence of variation in luminance and/or color at the irradiation surface. Here, only those aspects which are different from the foregoing first type of optical system will be described.

In the configuration shown in FIG. 2, respective lenses 411 and 421 of first lens array 41 and second lens array 42 are subdivided into lenslets, the lenslets produced by subdivision together constituting lens cells LC. That is, respective lenses 411 of first lens array 41 respectively constitute clusters of pluralities of lenslets 412, 412, . . . ; and respective lenses 421 of second lens array 42 respectively likewise constitute clusters of pluralities of lenslets 422, 422, . . . .

Sizes of the respective foregoing lens cells LC, LC, . . . and sizes of respective LED cells 31, 31, . . . corresponding thereto are identical. Furthermore, sizes of opposing lenslets 412 of first lens array 41 and lenslets 422 of second lens array 42 are identical.

In the present constitution, light exiting LED cells 31 is separately collected by respective lenslets 412, 412, . . . of lenses 411 of first lens array 41 in opposition thereto (i.e., the light is divided and is collected by first lens array 41), and irradiates respective lenslets 422, 422, . . . of lenses 421 of second lens array 42 installed to the front thereof and in opposition thereto. In addition, the light which irradiates these lenslets 422 is separately magnified by these lenslets 422, and is irradiated therefrom toward more or less the entirety of irradiation surface D. Such exiting of light from LED cells 31, collection of light by lenslets 412 of first lens array 41, and magnification by lenslets 422 of second lens array 42 are respectively carried out through the combined action of individual LED cells 31 and lenslets 412 and 422; as a result of which, light separately exiting respective LED chips 32, 32, . . . is collected/magnified in turn by lenslets 412 and 422, and is mutually combined in superposed fashion over more or less the entirety of irradiation surface D. This being the case, the present constitution is also such that even if there are individual differences in luminance and/or color between or among respective LED cells 31, 31, . . . , there will nonetheless be uniform irradiation of light, without variation in luminance and/or color, over the entire irradiation surface D.

Possible techniques for subdividing lens cells LC in the present constitution include, firstly, as shown at FIG. 3(a), a technique whereby these are each uniformly divided into identically sized lenslets 412, 412, . . . (lens cell LC at FIG. 3(a) being uniformly divided into nine portions to form lenslets 412, 412, . . . ).

Furthermore, as shown at FIG. 3(b), in another possible technique, each lens cell LC is nonuniformly divided into respective lenslets 412, 412, . . . (lens cell LC at FIG. 3(b) being divided into nine portions such that central lenslet 412' is smaller in size than other lenslets 412; the mode of subdivision therein being respectively the same from one lens cell LC to another).

Moreover, as shown at FIG. 3(c), in another possible technique, the mode of subdivision by which lens cell LC is divided into respective lenslets 412, 412, . . . is different from one of the respective lens cells LC, LC, . . . to another thereof (each lens cell LC at FIG. 3(c) being divided into nine portions such that each lens cell LC is nonuniformly divided into respective lenslets 412, 412, . . . ; the mode of subdivision therein being respectively different from one lens cell LC to another).

Where there are large individual differences in brightness between or among respective LED cells 31, 31, . . . , it will be more effective for eliminating variation in brightness at irradiation surface D if, as shown at FIGS. 3(a) and/or (b), there is nonuniform subdivision within each lens cell LC and/or across respective lens cells LC, since light from such regions will be combined in mutually superposed fashion and average each other out.

Figure 3:
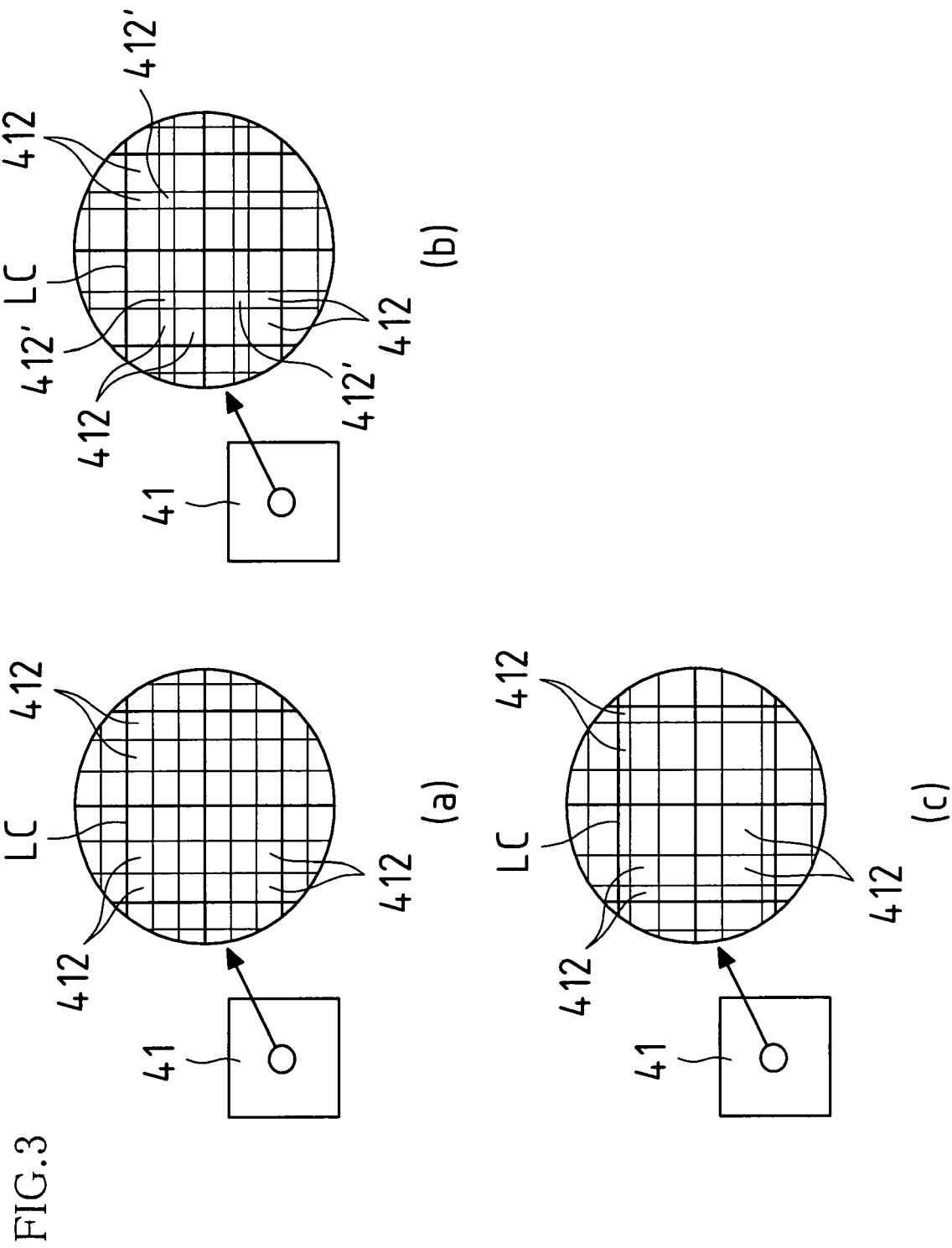
FIG. 3(a) is a drawing showing an example of a lens cell subdivision technique in which, within each of the lens cells, the respective lenslets therein are made to be mutually substantially identical in size.
FIG. 3(b) is a drawing showing an example of a lens cell subdivision technique associated with a mode of implementation other than that at FIG. 3(a).
FIG. 3(c) is a drawing showing an example of a lens cell subdivision technique that is associated with a mode of implementation other than that at FIG. 3(a).

Note that whereas FIG. 3 indicates subdivision technique(s) for lenses 411 of first lens array 41, lenses 421 of second lens array 42 will in such case be subjected to subdivision in similar fashion as at first lens array 41.

Furthermore, where lenses 411 and 412 of first and second lens arrays 41 and 42 are subdivided into lenslets in such fashion, arrayal of LED cells 31, 31, . . . may be such that optical axes of respective LED cells 31 and optical axes of lenslets 412 and 422 coincide, or such axes may be displaced in mutually parallel fashion (e.g., in a constitution such that LED cells 31, 31, . . . are arrayed uniformly on light source substrate 33).

Moreover, first lens array 41 may be attached in advance to LED plane light source 3 such that the two form a single integral unit.

Furthermore, color(s) of light emitted by LED cells 31, 31, . . . arranged at any one LED plane light source 3 may be selected depending upon the projection method(s) employed by the projector. For example, where the invention is being applied to a projector of the three-panel liquid crystal type (also referred to as the three-primary-color liquid crystal shutter projection type), because a single LED plane light source 3 functions as light source for a single color, LED cells 31, 31, . . . arranged at the same LED plane light source 3 will all emit light of the same color. That is, in correspondence to respective colors (e.g., the three primary colors), three sets of LED plane light source 3, first lens array 41, second lens array 42, and irradiation surface D shown in FIGS. 1 and/or 2 would be provided, color images from each thereof being combined by means of cross-dichroic prism(s) or the like and being projected onto a screen by projection lens(es).

On the other hand, where the invention is being applied to a projector of the reflective liquid crystal type or the micromirror (DMD=Digital Micromirror Device) type, LED cells 31, 31, . . . of respective colors red, green, and blue would be arrayed on a single LED plane light source 3, "timed lighting control" being used to switch which among the three primary colors is/are respectively emitting light, in correspondence to which reflective liquid crystal(s) and/or DMD(s) constituting irradiation surface D would be controlled so as to cause images of respective colors to be switched in high-speed fashion, and to be, in accompaniment thereto, projected onto a screen by projection lens(es).

Note that it is also possible to adopt a constitution in which a plurality of red, green, and blue LED cells 31, 31, . . . are respectively arrayed in two dimensions within the same plane to form LED plane light source 3, and this is used to cause red, green, and blue light to be combined in superposed fashion (by causing simultaneous emission of light therefrom) so as to irradiate irradiation surface D with white light. In such case, the white light would be separated into the three respective primary colors, respective images being formed thereafter and combined.

Figure 21:
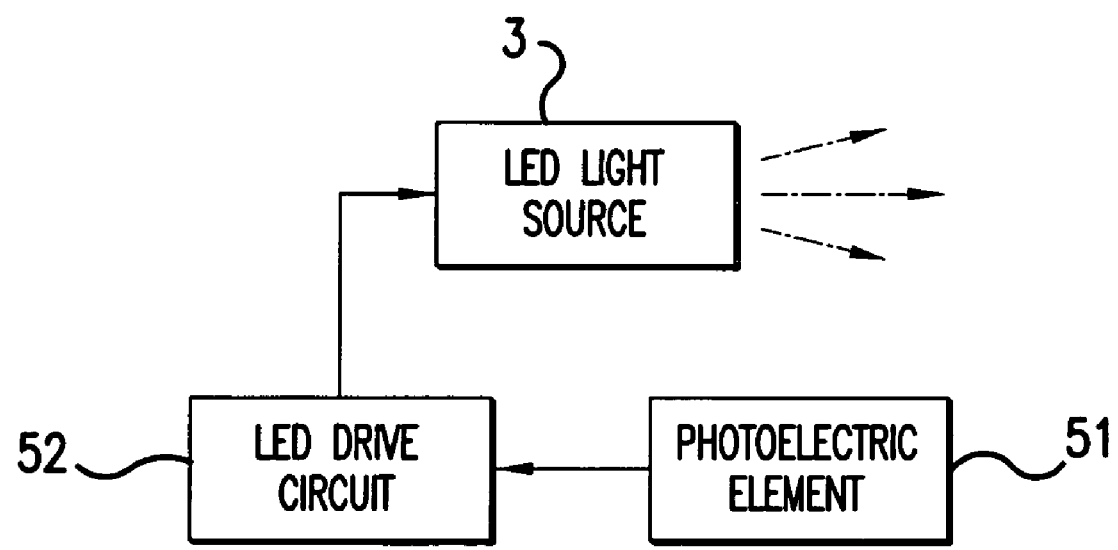
FIG. 21 is a drawing showing a schematic block diagram of a feedback circuit.

Furthermore, it is typically the case that there will be individual differences in brightness and/or color among LED chips 32 even where the same current is made to flow therethrough. Furthermore, brightness and/or color will vary with passage of time, will vary as a function of temperature, and so forth. Accordingly, where, for example, color images are to be projected through superposed combination of red, green, and blue light, as can be seen in FIG. 21 a constitution may be adopted in which brightnesses of LED light sources 3 of respective colors are monitored through use of photoelectric element(s) 51, signal(s) therefrom being fed back into LED drive circuit(s) 52 so as to permit adjustment of white balance. As examples of methods for controlling brightness(es) of LED chip(s) 32, a method in which value(s) of current(s) flowing through LED chip(s) 32 is/are controlled, and a method in which lit times of LED chips 32 of respective colors are controlled in the context of a configuration in which timed lighting is carried out with respect to the LED chips 32 of the three colors, may be cited.

Embodiments

Figure 4:
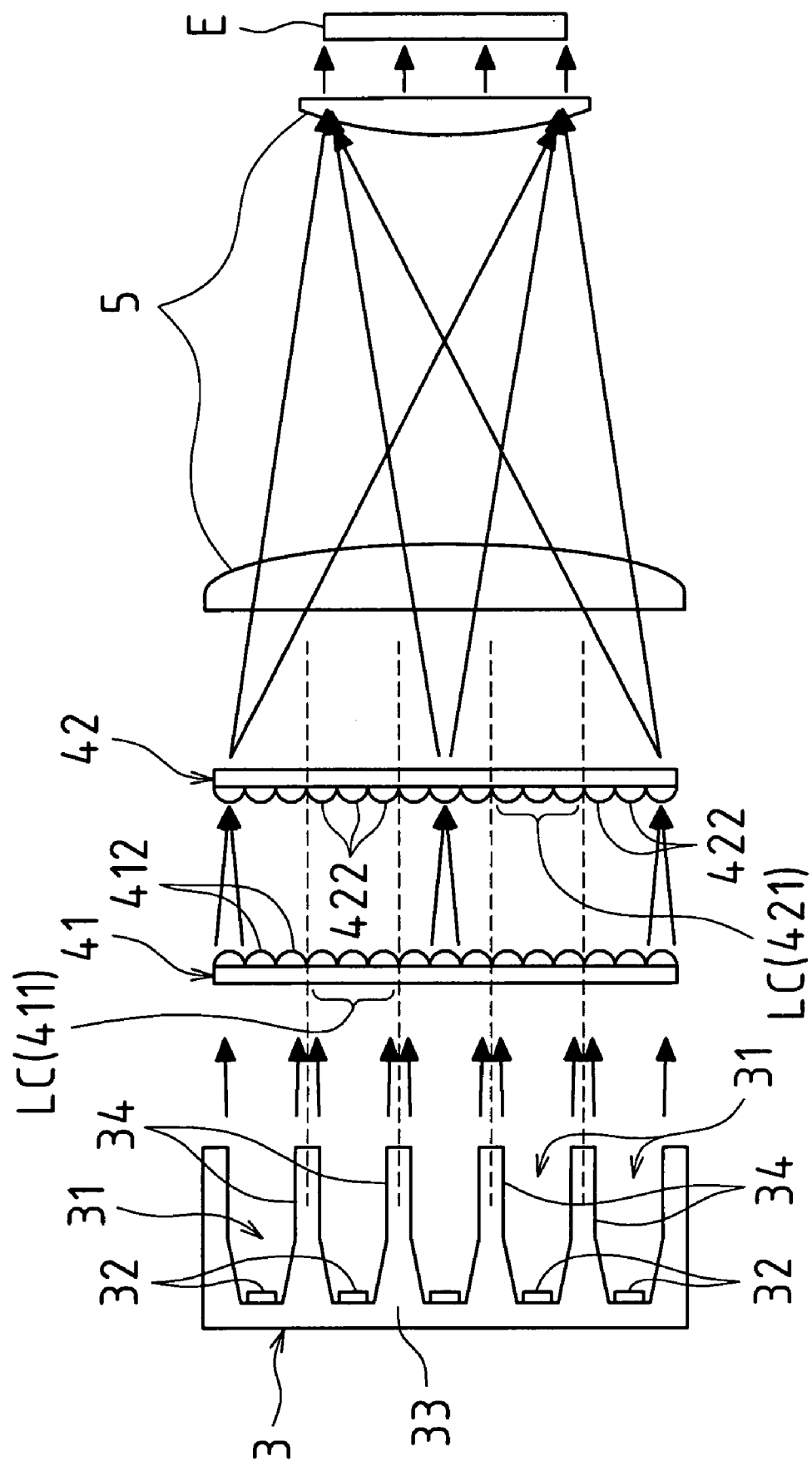
FIG. 4 is a drawing showing an optical system configuration associated with an embodiment.

Next, referring to FIG. 4, specific embodiments applying the foregoing projection-related principles to a projector optical system are described. Description here will be with respect to a situation in which the foregoing second type of optical system is used.

As shown in FIG. 4, arranged to the front of LED plane light source 3 (i.e., in the direction from which light exits therefrom) is first lens array 41; arranged to the front of that is second lens array 42; arranged to the front of that are two condenser lenses 5, 5; and arranged to the front of that is/are DMD(s), liquid crystal panel(s), or other such pictorial element(s) E. The foregoing condenser lenses 5, 5 are for optically manipulating irradiated light so as to cause it to conform to the dimensions of picture element(s) E.

Formed at LED plane light source 3 are a plurality of LED cells 31, 31, . . . comprising a plurality of red, green, and blue LED chips 32 arrayed in two dimensions on the same substrate. First lens array 41 and second lens array 42 are each provided with lens cells LC identical in size to LED cells 31, each such lens cell LC being made up of three rows and three columns to constitute nine lenslets 412, 412, . . . , 422, 422, . . . .

Furthermore, sizes of corresponding lens cells LC, LC of first and second lens arrays 41 and 42 are mutually identical. Furthermore, sizes of lenslets 412 of first lens array 41 and sizes of lenslets 422 of second lens array 42 are identical.

As a result of the foregoing constitution, respective red, green, and blue LED cells 31, 31, . . . are made to undergo timed lighting; and in synchronous fashion therewith, picture element(s) E operate in "field sequential" fashion to create images of respective colors, the color image(s) so created being projected onto a screen, not shown.

Other Embodiments

In the foregoing embodiments, description was carried out in terms of a situation in which LED plane light source 3, first lens array 41, and second lens array 42 were installed in respectively independent fashion, or in which LED plane light source 3 was integral with first lens array 41. But the present invention is not limited thereto, it being possible to adopt a constitution in which first lens array 41 is integral with second lens array 42, or in which the foregoing three elements are integral with one another.

Next, projection equipment (e.g., a projector or the like) equipped with optical system(s) associated with any of the foregoing embodiments is described below with reference to the drawings. Before describing specific modes of application of projectors associated with one or more embodiments of the present invention (equipment featuring same and so forth), the constitution of and principles behind projection in projector optical modules associated with one or more embodiments of the present invention will first be explained.

First Type of Optical Module

Description will first be carried out with respect to a first type of optical module employing reflective liquid crystal(s) or micromirror(s) (DMD=Digital Micromirror Device(s)) as image forming means.

Figure 5:
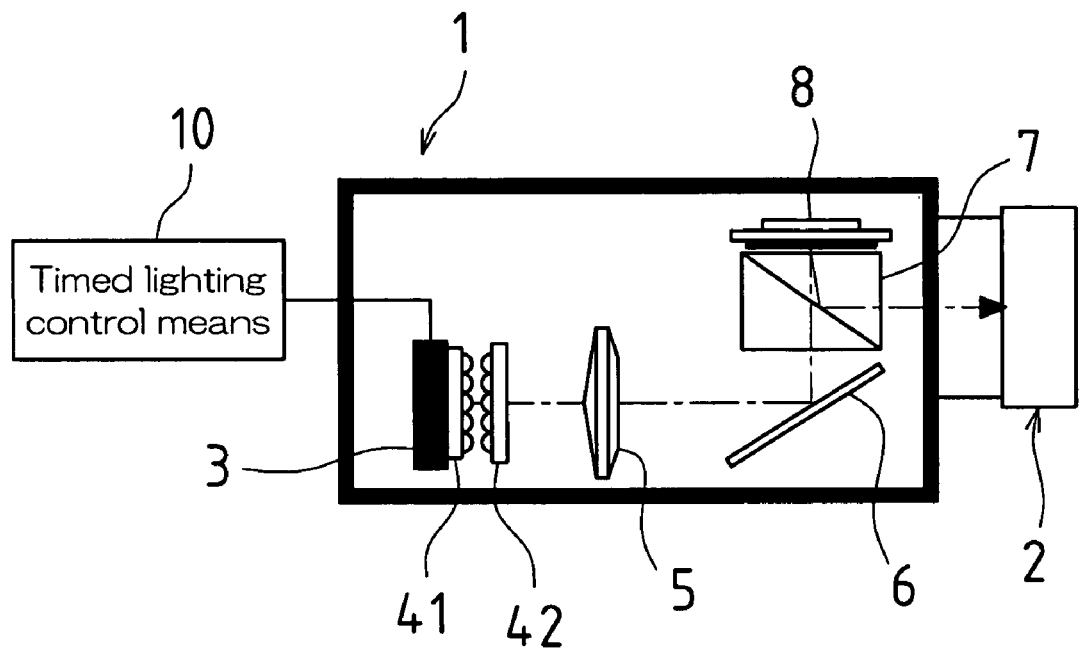
FIG. 5 is a schematic diagram showing the first type of optical module and a projection lens disposed at the side thereof at which images are irradiated.
Figure 6:
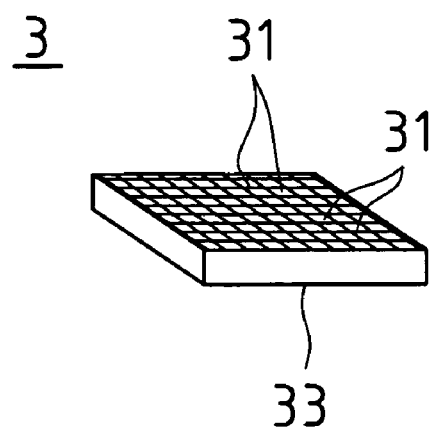
FIG. 6 is an oblique view of an LED plane light source.
Figure 7:
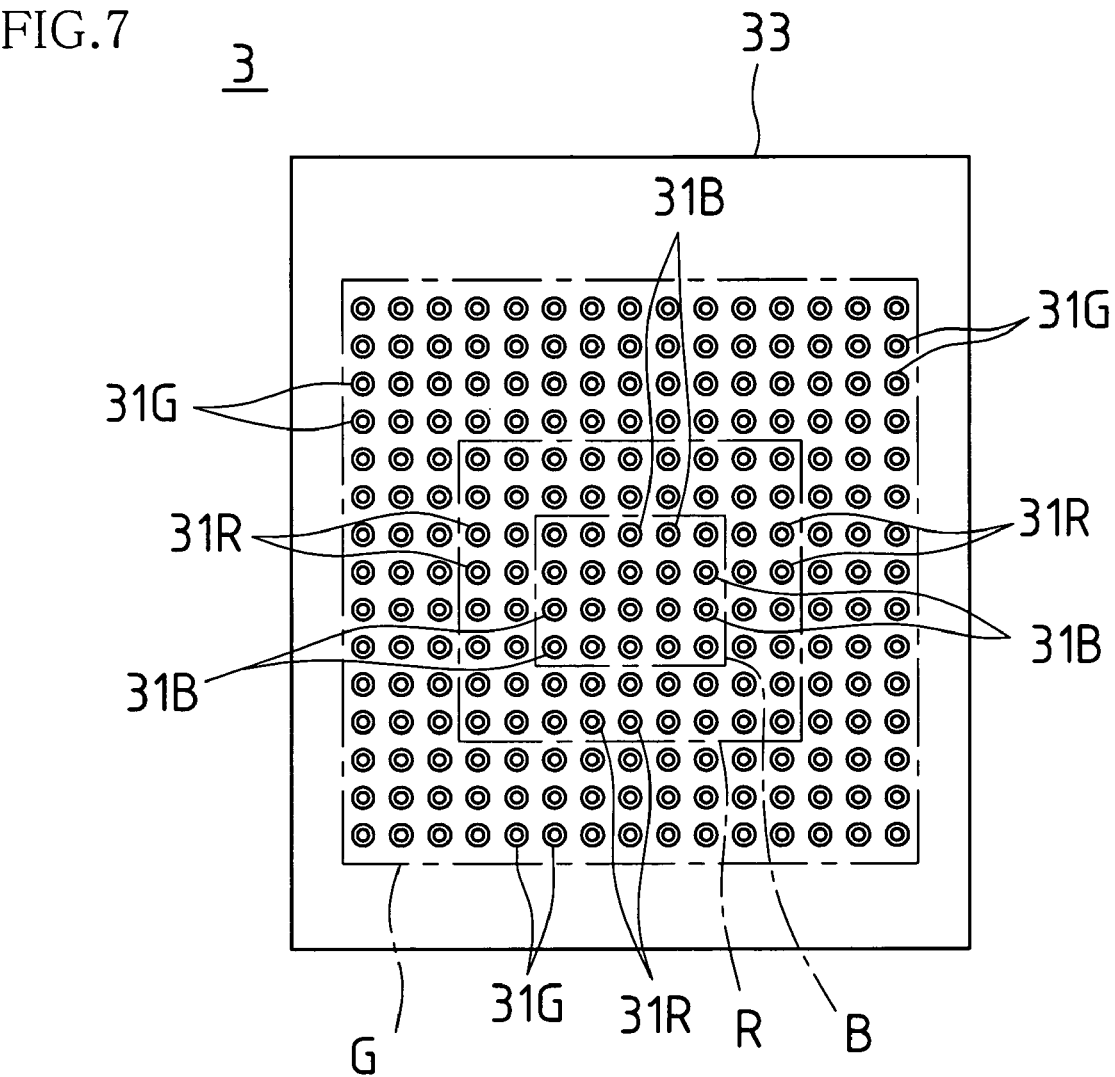
FIG. 7 is a front view of an LED plane light source.
Figure 8:
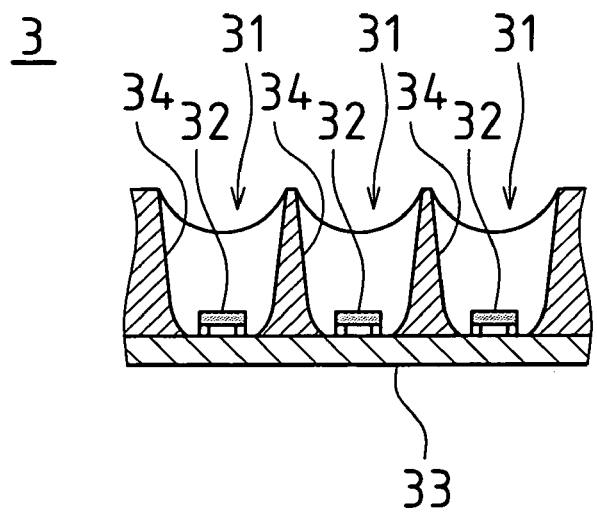
FIG. 8 is an enlarged cross-sectional view of LED cells making up an LED plane light source.

FIG. 5 is a schematic diagram showing optical module 1 of the present type, and projection lens 2 disposed at the side thereof at which images are irradiated. As shown in this FIG. 5, provided as light source at optical module 1 of the present embodiment is LED plane light source (LED array) 3, at which a multiplicity of LED cells 31, 31, . . . (see FIG. 6) are arrayed on the same substrate 33. Below, description of the constitution of this LED plane light source 3 is carried out in specific terms. FIG. 6 is an oblique view of LED plane light source 3; FIG. 7 is a front view of LED plane light source 3 (as viewed from a point downstream in the direction of irradiation of light); and FIG. 8 is an enlarged cross-sectional view of LED cells 31, 31, . . . making up LED plane light source 3.

As can be seen from the drawings, LED plane light source 3 serves as light source and comprises plurality of LED chips 32, 32, . . . arrayed horizontally and vertically after the fashion of a matrix (e.g., there might be 15 thereof in each the horizontal and the vertical direction). Respective LED chips 32, 32, . . . are arranged such that one of each thereof is individually housed within the interior of each of plurality of reflectors 34, 34 . . . which are formed in integral fashion with respect to light source substrate 33. In this way, a reflector 34 and the LED chip 32 housed therein together constitute one of the foregoing LED cells 31; and so, consequently, the constitution of the present LED plane light source 3 is such that plurality of LED cells 31, 31, . . . are arrayed therein in matrix fashion.

Description will next be carried out with respect to color(s) of light emitted by LED cells 31, 31, ... provided at LED plane light source 3; which is to say that description will be carried out with respect to mode(s) of arraying LED cells 31, 31, ... of respective colors. At FIG. 7, region R is a region at which red LED cells 31R, 31R, ..., housing red LED chips emitting light of red wavelength(s), are arrayed. Region G is a region at which green LED cells 31G, 31G, ..., housing green LEDs emitting light of green wavelength(s), are arrayed. Region B is a region at which blue LED cells 31B, 31B, ..., housing blue LEDs emitting light of blue wavelength(s), are arrayed. In this way, the surface of light source substrate 33 of LED plane light source 3 is partitioned into three regions R, G, B; LED cells 31 R, ..., 31G, 31G, ..., 31B, 31B, ... of a single color being arrayed within a single partition. By thus arranging LED cells of the same color within the same region so as to collectively form an LED cell group, it is possible to achieve simplification in mode(s) of wiring with respect to electrical wiring (e.g., when connection is made in parallel) for separate supply of electricity to such respective sets of LED cells of respective colors.

Furthermore, respective LED cells 31R, 31R, ..., 31G, 31G, ..., 31B, 31B, ... operate in timed lighting fashion such that LED cells emitting light of the same color are switched in mutually simultaneous fashion between lit and extinguished states. That is, switching sequentially occurs from lit operation of red LED cells 31R, 31R, ... to lit operation of green LED cells 31G, 31G, ... to lit operation of blue LED cells 31B, ... ; light exiting this LED plane light source 3 being sequentially switched from red to green to blue. This timed lighting operation takes place under the control of timed lighting control means 10 which is connected to LED plane light source 3.

In addition, installed in front of the foregoing LED plane light source 3 (i.e., in the direction from which light exits therefrom) is first lens array 41 in which there are arranged a plurality of lenses individually opposing respective LED cells 31, 31, .... Sizes of respective lenses provided at this first lens array 41 respectively match sizes of opposing LED cells 31, 31, ....

Moreover, installed in the front of the foregoing first lens array 41 (i.e., in the direction from which light exits therefrom) is second lens array 42 in which there are arranged a plurality of lenses individually opposing respective lenses of the first lens array 41. Sizes of respective lenses provided at this second lens array 42 respectively match sizes of opposing lenses of first lens array 41. That is, sizes of respective LED cells 31, sizes of lenses of first lens array 41 corresponding thereto, and sizes of lenses of second lens array 42 in opposition thereto are chosen so as to be mutually identical.

Furthermore, arranged to the front of the foregoing second lens array 42 (i.e., in the direction from which light exits therefrom) are condenser lens 5 and reflecting mirror 6. Furthermore, arranged downstream in the optical path from this reflecting mirror 6 are dichroic prism 7 and image forming means (reflective liquid crystal(s) and/or DMD(s)) 8.

The foregoing condenser lens 5 optically manipulates light which has been irradiated from LED plane light source 3 and which has passed through respective first and second lens arrays 41 and 42 so as to cause it to conform to the dimensions of image forming means 8. That is, light which is optically manipulated by this condenser lens 5 is reflected by reflecting mirror 6 and passes through dichroic prism 7 to irradiate image forming means 8.

At image forming means 8, the image(s) that is/are formed is/are switched in correspondence to color(s) of light emitted from LED plane light source 3, which is switched by means of "timed lighting control, " such image(s) being reflected so as to be directed toward dichroic prism 7. That is, red image(s), green image(s), and blue image(s) formed by image forming means 8 are sequentially reflected so as to be directed toward dichroic prism 7. Because constitution and switching action of reflective liquid crystal(s) and/or DMD(s) carrying out switching of image(s) in correspondence to such received color(s) (color(s) of light exiting LED plane light source 3) are known, description is omitted here. In addition, image(s) formed as a result of reflection by this image forming means 8 is/are reflected by dichroic prism 7 so as to be directed toward projection lens 2, and is/are projected from this projection lens 2 toward projection surface(s) (screen(s) or the like) constituting image irradiation surface(s), not shown.

Figure 9:
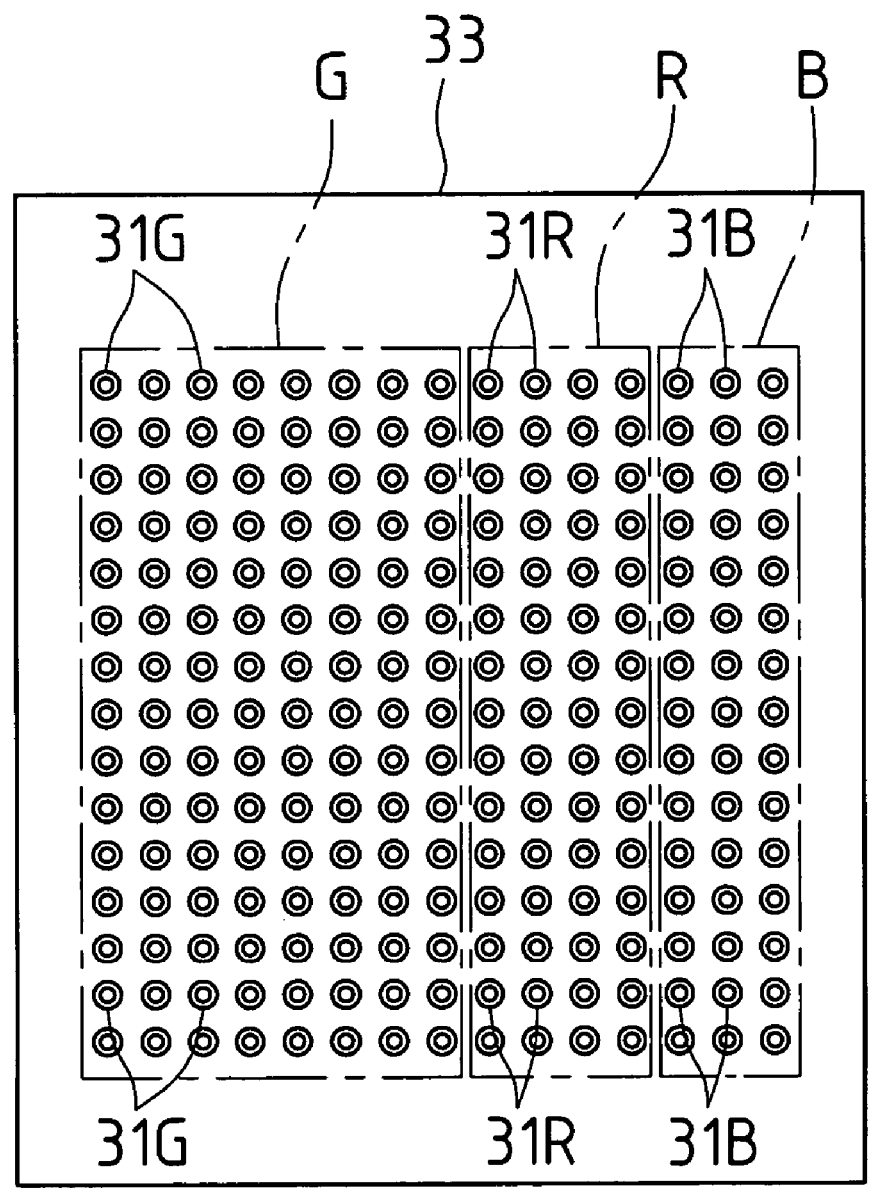
FIG. 9 is a drawing corresponding to FIG. 7 and showing a variation on a mode of arraying LED cells.
Figure 10:
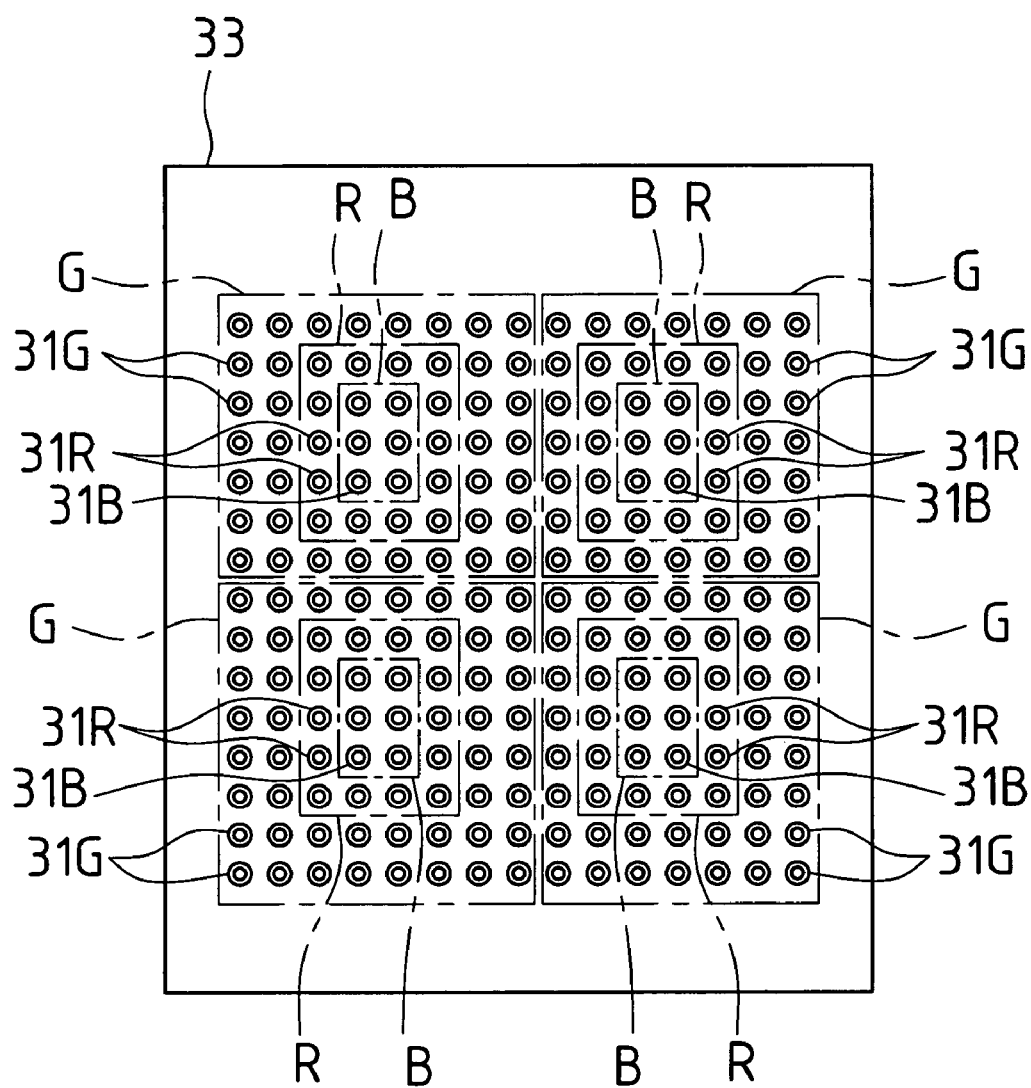
FIG. 10 is a drawing corresponding to FIG. 7 and showing another variation on a mode of arraying LED cells.

Note, however, that the present invention is not limited to the foregoing mode of arraying LED cells of respective colors 31R, 31R, ..., 31G, 31G, ..., 31B, 31B, .... FIGS. 9 and 10 show variations on this mode of arraying LED cells. At these drawings, the surface of light source substrate 33 of LED plane light source 3 is partitioned into different regions R, G, B for respective colors; LED cells 31R, 31R, ..., 31G, 31, ..., 31B, 31B, ... of a single color being arrayed within a single partition. Note that the present invention is not limited to the foregoing three modes of arraying LED cells, it being possible to employ any arbitrary ydesign.

Second Type of Optical Module

Description will next be carried out with respect to a second type of optical module constructed as an optical system of the three-panel liquid crystal type.

Figure 11:
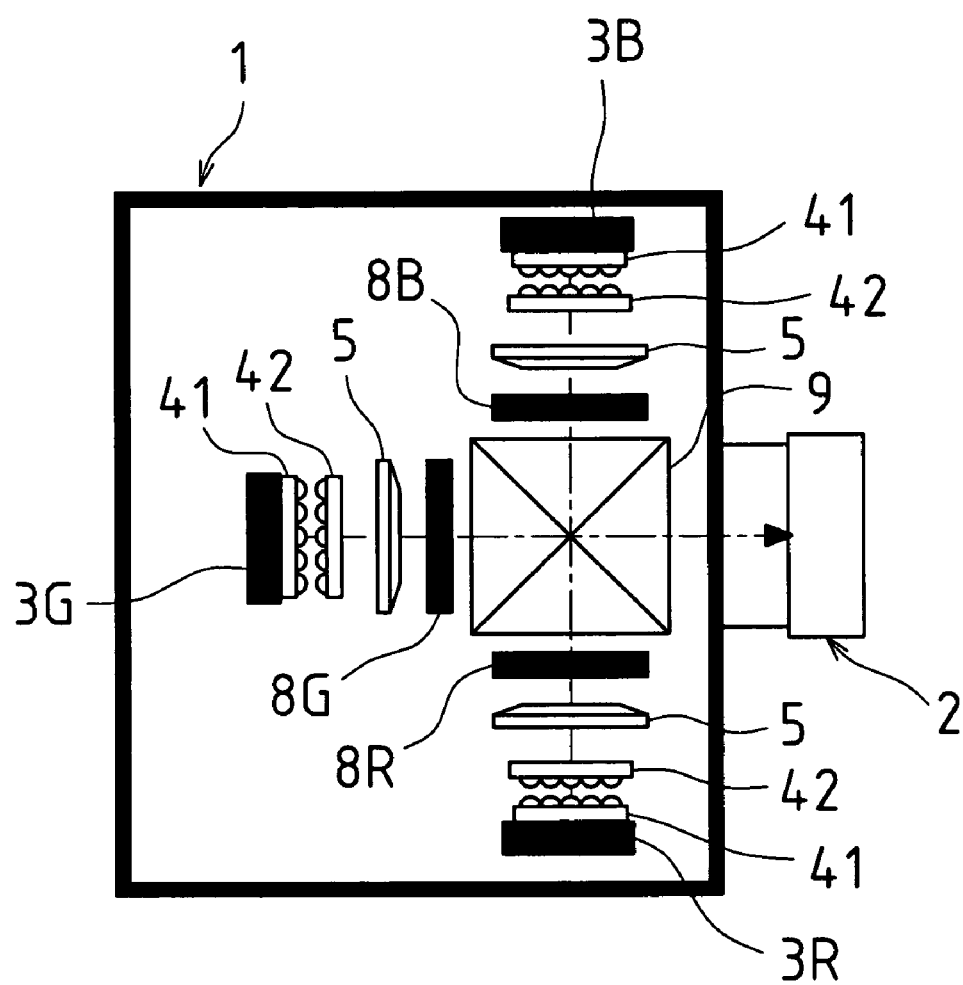
FIG. 11 is a schematic diagram showing the second type of optical module and a projection lens disposed at the side thereof at which images are irradiated.

FIG. 11 is a schematic diagram showing optical module 1 of the present type, and projection lens 2 disposed at the side thereof at which images are irradiated. As shown in this FIG. 11, provided as light sources at optical module 1 of the present embodiment are three species of LED plane light sources (LED arrays) 3R, 3G, 3B, at each of which in respective correspondence to the three primary colors of light—red, green, and blue—a multiplicity of LED cells are arrayed on the same substrate. That is, provided therein are red LED plane light source 3R for emission of red light, green LED plane light source 3G for emission of green light, and blue LED plane light source 3B for emission of blue light.

Below, description of respective LED plane light sources 3R, 3G, 3B of the present type is carried out in specific terms. As was the case with the optical module of the first type which was described above, each of respective LED plane light sources 3R, 3G, 3B is constructed such that a plurality of LED chips 32 are arrayed horizontally and vertically after the fashion of a matrix (e.g., there might be 15 thereof in each the horizontal and the vertical direction). Furthermore, respective LED chips 32 are arranged such that one of each thereof is individually housed within the interior of each of a plurality of reflectors which are formed in integral fashion with respect to the light source substrate (constitution being in this respect similar to that of the optical module of the first type which was described with reference to FIG. 8). In this way, a reflector and the LED chip 32 housed therein together constitute one of the aforementioned LED cells 31; and so, consequently, the constitution of each of respective LED plane light sources 3R, 3G, 3B is such that a plurality of LED cells 31 are arrayed therein in matrix fashion. In addition, at each of the three species of LED plane light sources 3R, 3G, 3B, the LED cells 31 provided therein are chosen so as to emit light of the same color.

More specifically, LED cells 31R provided at the LED plane light source located at the bottom of FIG. 11 house red LED chips emitting light of red wavelength(s); this LED plane light source constituting red LED plane light source 3R. Furthermore, LED cells provided at the LED plane light source located at the left side of FIG. 11 house green LED chips emitting light of green wavelength(s); this LED plane light source constituting green LED plane light source 3G. Moreover, LED cells provided at the LED plane light source located at the top of FIG. 11 house blue LED chips emitting light of blue wavelength(s); this LED plane light source constituting blue LED plane light source 3B.

In addition, respectively installed to the front of each of the foregoing respective LED plane light sources 3R, 3G, 3B (i.e., in the direction from which light exits therefrom) are first lens array 41, second lens array 42, and condenser lens 5; these being similar to those at the foregoing optical module of the first type.

In addition, installed in respectively separate fashion to the front of each of the respective condenser lenses 5, 5, 5 (i.e., in the direction from which light exits therefrom) are transmissive liquid crystals 8R, 8G, 8B serving as image forming means; these transmissive liquid crystals 8R, 8G, 8B forming images in correspondence to respective colors. In addition, light of respective colors transmitted therethrough is combined by cross-dichroic prism 9 serving as image combining means, and image(s) formed as a result of such combination is/are reflected so as to be directed toward projection lens 2 and is/are projected from this projection lens 2 toward projection surface(s) (screen(s) or the like) constituting image irradiation surface(s), not shown.

Embodiments

Description will next be carried out in specific terms with respect to modes of application in projectors having the aforementioned optical module(s) 1 and/or projection lens (es) 2. At the respective modes of application described below, optical module(s) of the foregoing first type and/or optical module(s) of the foregoing second type may be applied therein.

Description is first carried out with respect to modes of application to electronic equipment (e.g., laptop-type personal computer(s), mobile telephone(s), and/or the like) incorporating therewithin or capable of being connected to the foregoing projector and constituted so as to permit image(s) to be projected from such projector(s) toward screen(s) and/or other such image irradiation surface(s).

Laptop-Type Personal Computer

Figure 12:
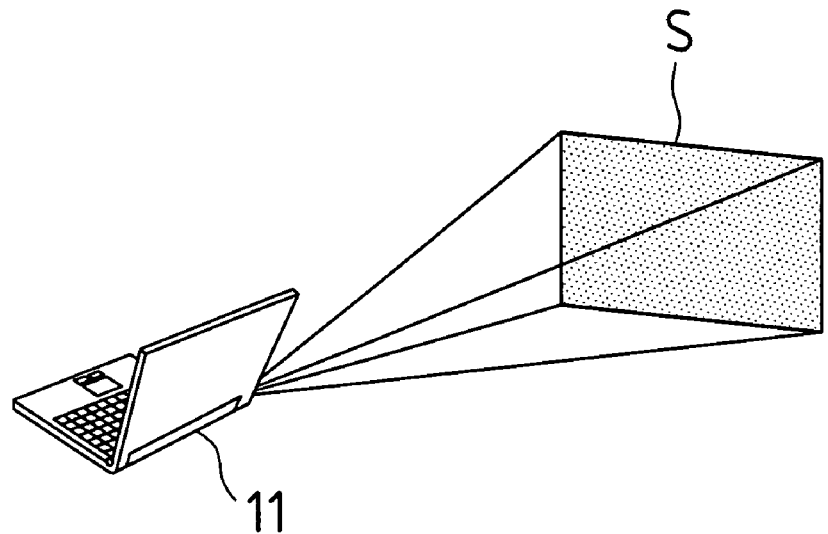
FIG. 12 is a drawing showing operation during projection in a situation where a projector is incorporated within a laptop-type personal computer.

Firstly, FIG. 12 shows a situation in which the foregoing projector is incorporated within a laptop-type personal computer (hereinafter "laptop PC") 11. The foregoing projection lens 2 might, for example, be disposed so as to abut a side face of the main body of laptop PC 11 such that image(s) can be projected from this projection lens 2 toward screen S.

It had heretofore been necessary, for projection of image(s) and/or video(s) stored at laptop PC(s) onto screen(s), to connect such laptop PC(s) to large projector(s) and to deliver the image(s) and/or video(s) from the laptop PC(s) to such projector(s) in order to cause projection thereof onto screen(s). For this reason, procedures for connection of wiring and procedures involving various settings had been necessary. Because the present example makes it possible for a laptop PC to also function as projector, the need for such procedures is eliminated, with excellent effect on user-friendliness.

Connection to Mobile Telephone

Figure 13:
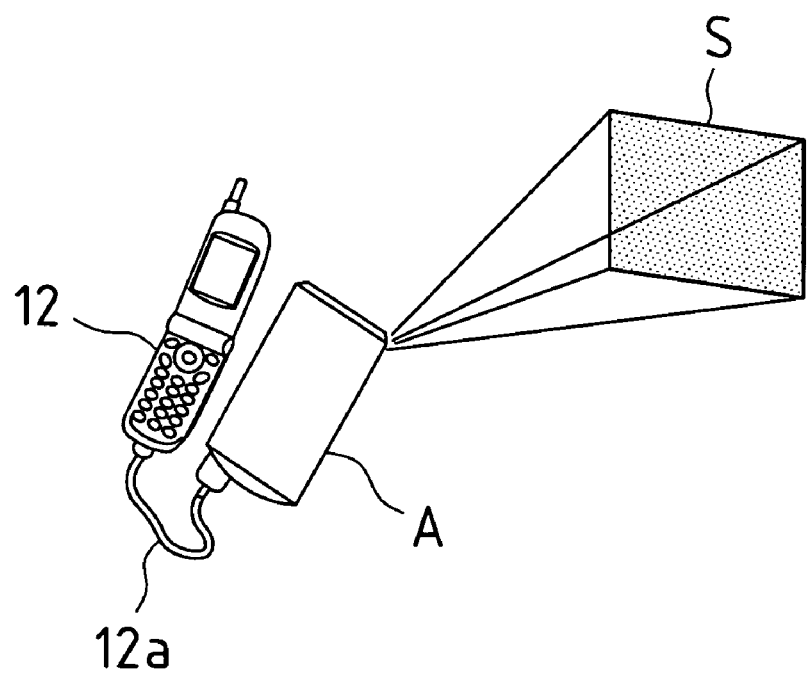
FIG. 13 is a drawing showing operation during projection in a situation where a projector is capable of being connected to a mobile telephone.

FIG. 13 shows a situation in which the foregoing projector A is constructed such that it is capable of being connected to mobile telephone 12. Projector A and mobile telephone 12 might, for example, be connected by way of communication cable 12a so as to permit Internet information, electronic mail information, miscellaneous matter, television screenshots, game screenshots, and/or the like obtained from mobile telephone 12 to be transmitted to projector A and projected from this projector A onto screen S.

Because, as described above, projector A in one or more embodiments of the present invention is small in size and permits reduction in electrical power consumption, projector A can be made portable and can be made capable of being driven by battery or batteries; and so, consequently, it is possible to construct a portable projection system which is such that projector A can be carried about in portable fashion together with mobile telephone 12 and which is such that projection onto screen S or the like can be carried out as the need arises.

Handheld Terminal Device

Figure 14:
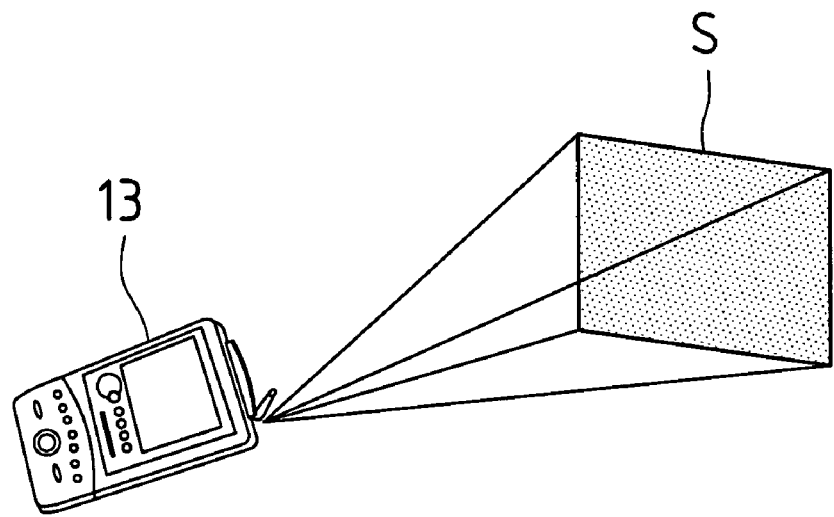
FIG. 14 is a drawing showing operation during projection in a situation where a projector is incorporated within a PDA device.

FIG. 14 shows a situation in which the foregoing projector is incorporated within handheld terminal device (PDA) 13. The foregoing projection lens 2 might, for example, be disposed so as to abut the top face of PDA 13 such that image(s) can be projected from this projection lens 2 toward screen S. This will permit Internet information, electronic mail information, miscellaneous matter, television screenshots, game screenshots, and/or the like obtained from PDA 13 to be projected onto screen S. In this case as well, it is possible to construct a portable projection system which is such that projector A can be carried about in portable fashion and which is such that projection onto screen S or the like can be carried out as the need arises. Where various software is, for example, used to create presentation materials, there would no longer be a need to use elaborate projection equipment to display such presentation materials on a large screen.

Household Electronic Game Device

Figure 15:
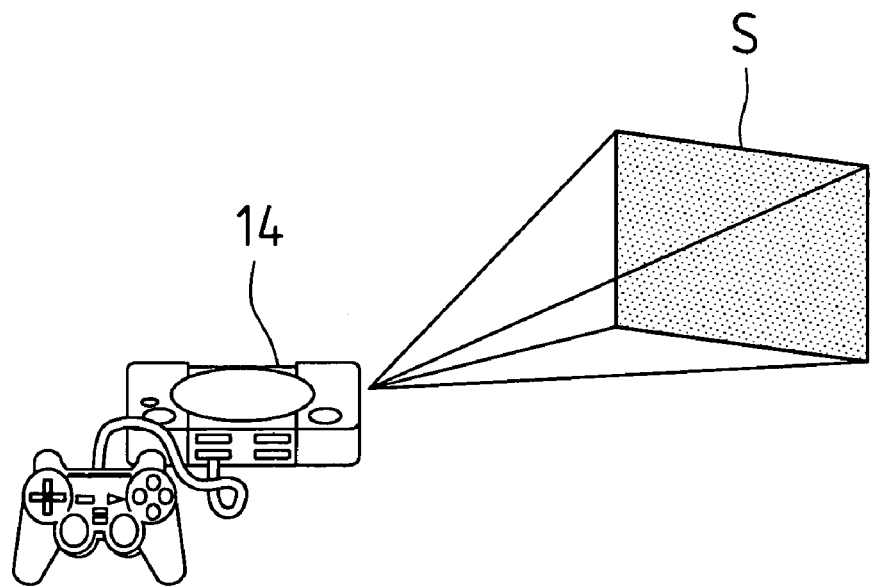
FIG. 15 is a drawing showing operation during projection in a situation where a projector is incorporated within a household electronic game device.

FIG. 15 shows a situation in which the foregoing projector is incorporated within household electronic game device 14. The foregoing projection lens 2 might, for example, be disposed so as to abut a side face of household electronic game device 14 such that game image(s) can be projected from this projection lens 2 toward screen S.

It had heretofore been necessary, when using household electronic game device(s), to connect such household electronic game device(s) to television(s) and/or projector(s). For this reason, procedures for connection of wiring and so forth had been necessary. Not only does the present example make such procedures for connection of wiring and so forth unnecessary, but it also makes it possible to use household electronic game device(s) under circumstances where no television(s) and/or projector(s) is/are present.

This concludes description of modes of application to electronic equipment.

Description is next carried out with respect to modes of application to automobiles (vehicles) having in-vehicle projection system(s) provided with the foregoing projector and permitting image(s) from such projector(s) to be projected toward screen(s) and/or other such image irradiation surface(s).

In-Vehicle Projection System

Figure 16:
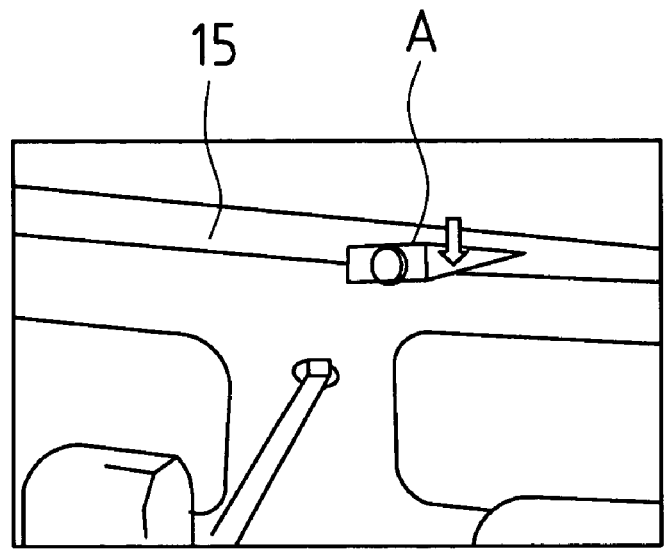
FIG. 16(a) is a drawing showing installation of a projector in the context of application of a projector to an in-vehicle video system.
FIG. 16(b) is a drawing showing installation of a screen in the context of application of a projector to an in-vehicle video system.
Figure 16:
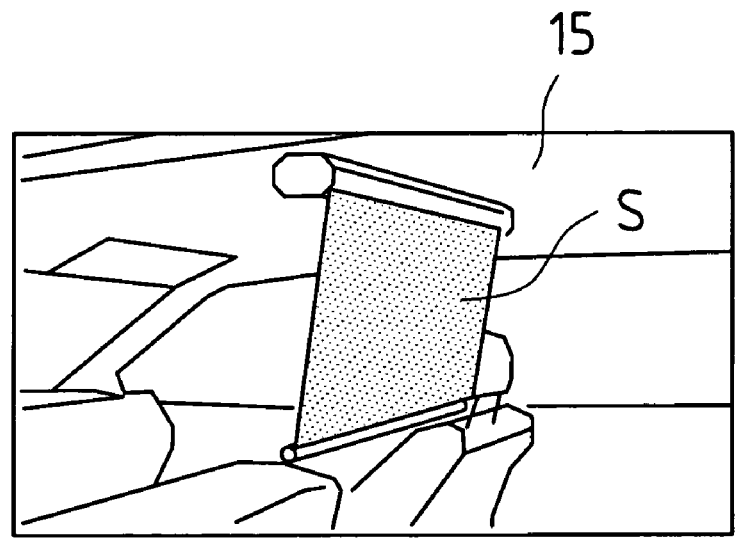

FIG. 16 shows a situation in which the foregoing projector A is applied to an in-vehicle video system. As shown at FIG. 16(*a*), projector A is storably installed at roof portion 15 within a vehicle. This FIG. 16(*a*) shows the situation that exists when projector A has been pulled downward (i.e., has been rotated downward) from roof portion 15 (see arrow in drawing). When pulled downward in such fashion, the projection lens is directed toward the front of the vehicle such that image(s) can be projected frontward. Moreover, when this projector A is not in use, it can be stored within the roof so as to cause the bottom surface of projector A to be flush with the roof surface.

Furthermore, installed between the front and back seats of the automobile is a roll-type retractable screen S; and as shown at FIG. 16(*b*), by pulling this retractable screen S downward it is possible to cause image(s) from projector A to be projected thereonto. This permits images of various types (various types of images including those from television, DVD, VCR, games, etc.) to be projected onto screen S.

Moreover, because LED plane light source 3 can be driven with low voltages, it is possible in the present example for car battery or batteries (e.g., 12 VDC) to be used as power source for projector A.

In-Vehicle Monitor System

Figure 17:
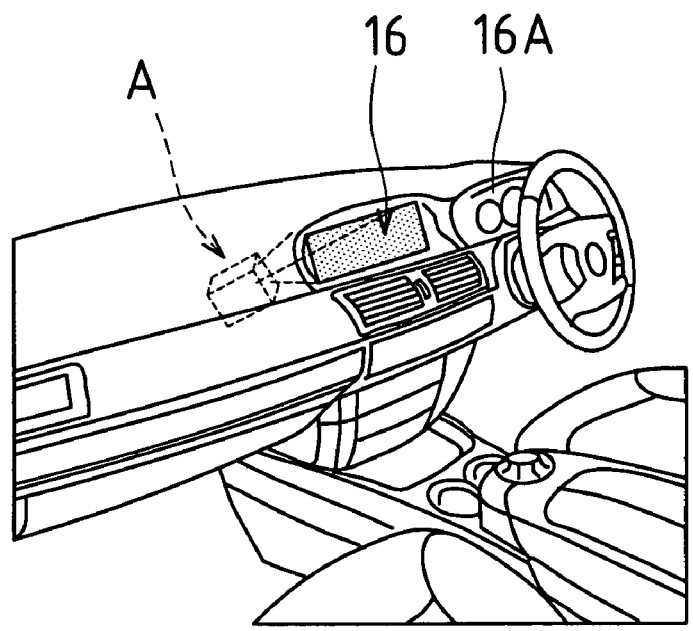
FIG. 17 is a drawing showing application of a projector to an in-vehicle monitor system.

FIG. 17 shows a situation in which the foregoing projector A is applied to an in-vehicle monitor system. As shown in the drawing, projector A is installed in a dashboard within a vehicle. Furthermore, monitor screen (center panel) 16 is installed at the dashboard such that image(s) (e.g., car navigation images) from the foregoing projector A can be projected onto monitor screen 16.

Note that instrument panel 16A to the front of the driver's seat or the windshield could also be used as the screen onto which such images are projected from projector A. That is, it is sufficient that such screen be visible to the driver and/or to passenger(s) riding therein. Here as well, it is possible for car battery or batteries (e.g., 12 VDC) to be used as power source for projector A.

Projection System for Advertisement-Displaying Vehicle

Figure 18:
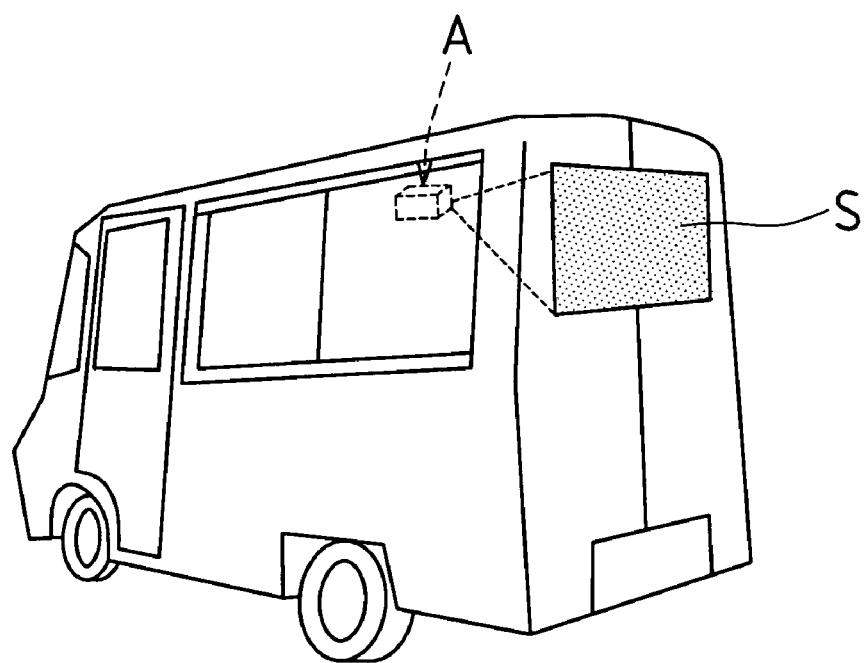
FIG. 18 is a drawing showing application of a projector to an advertisement-displaying vehicle.

FIG. 18 shows a situation in which the foregoing projector A is applied to an advertisement-displaying vehicle. As shown in the drawing, projector A, being suspended from the roof portion within the vehicle, is installed so as to project image(s) toward the rear of the vehicle.

Furthermore, at the rear of the vehicle (at a back window in the present example), screen S, onto which image(s) from the foregoing projector A can be projected, is installed so as to be visible from outside the vehicle. In addition, advertisement(s) or other image(s) can be projected from projector A toward screen S. Images serving as commercial messages for companies and/or stores may be cited as examples of images which may be projected at such time. Furthermore, where such vehicle is used as mobile store (e.g., a traveling shop selling food and beverage or the like), images projected onto screen S can be utilized for advertisements, signs, menus, displays, and so forth.

Note that the location(s) at which screen S onto which images from projector A are projected is installed is/are not limited to the back window portion, but same may also be installed at side window portions and/or at various locations along the car body.

Tent Projection System

Figure 19:
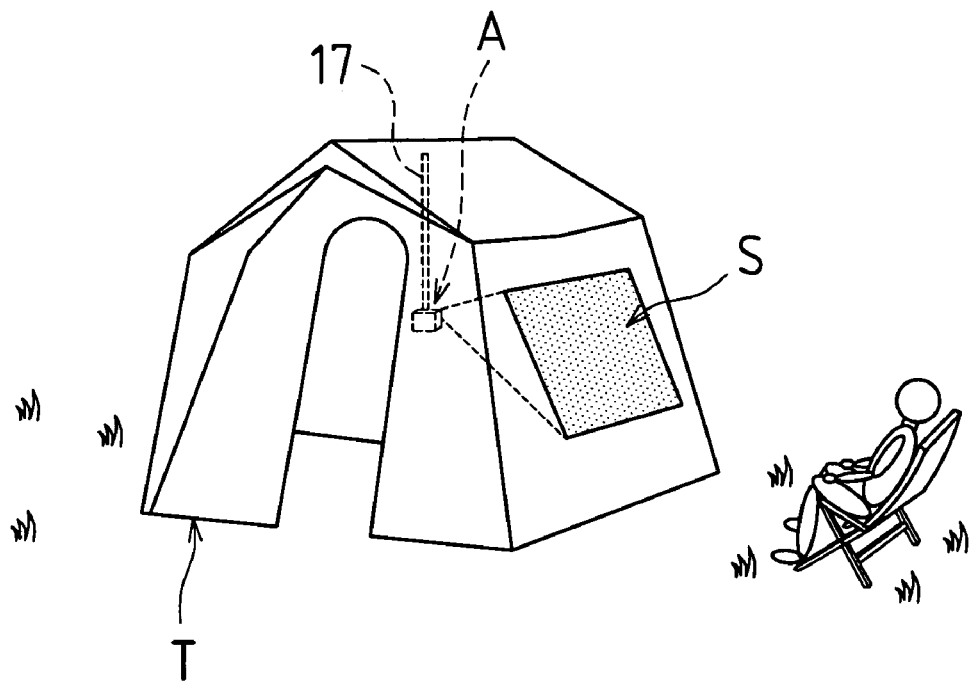
FIG. 19 is a drawing showing application of a projector to a tent projection system.

FIG. 19 shows a situation in which the foregoing projector A is applied to a tent projection system. As shown in the drawing, during outdoor camping, such system is for projecting image(s) onto the fabric of tent T and/or onto screen S attached to such fabric. That is, projector A is arranged at the central portion of tent T, being installed therein or being suspended from angle mount 17, such that image(s) from this projector A is/are projected onto the fabric or screen S.

In such case, because it may be necessary to flip the images which are projected onto the fabric or screen S depending upon whether the images are to be viewed from outside the tent (the situation shown in FIG. 19) or whether the images are to be viewed from inside the tent, a constitution is adopted that permits flipping of images in correspondence to the particular application.

Showcase

Figure 20:
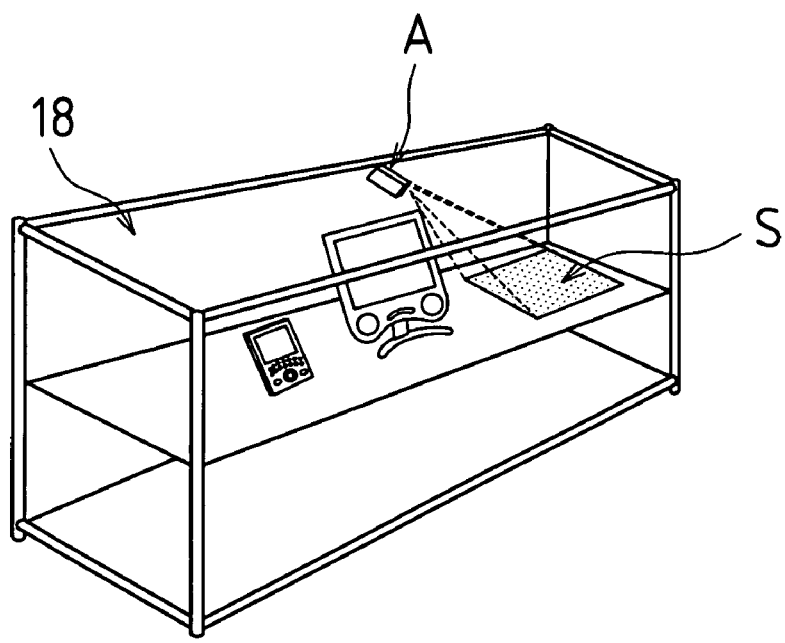
FIG. 20 is a drawing showing application of a projector to a showcase.

FIG. 20 shows a situation in which the foregoing projector A is applied to a showcase 18. As shown in the drawing, projector A is installed within showcase 18 at the top portion thereof, and screen S is provided on a display shelf within showcase 18. In addition, images related to products on display (images of scenes featuring products and/or images in the form of commercial messages) are projected toward screen S from projector A. Because, as described above, projector A in one or more embodiments of the present invention can be made small in size, it is possible to install projector A in the limited space that exists within the showcase.

Furthermore, in the present projection system, it is also possible to attach special transparent film (high-reflectivity film) to a glass showcase and to project images onto same from behind. Thus, because it may be necessary to flip the images which are projected depending upon whether the images are to be projected onto screen S on the display shelf or whether the images are to be projected from behind the glass showcase, in the present example as well a constitution is adopted that permits flipping of images in correspondence to the particular application.

Other Embodiments

In the embodiments which have been described above there was no particular limitation made with respect to power supply or supplies for lighting of LEDs; indeed, it is possible to use household alternating-current power supply or supplies, storage cell(s), secondary cell(s) (storage cell(s) capable of being reused after being recharged), car battery or batteries, fuel cell(s), and/or any of a wide variety of other such power supply or supplies.

Furthermore, in the present invention there is no limitation, e.g., based on the type of electronic equipment, with respect to the choice of whether projector A is to be incorporated within electronic equipment and/or is to be connected thereto by way of communication cable(s). For example, at the examples shown in FIG. 12, FIG. 14, and FIG. 15, it is also possible to connect projector A to the electronic equipment by means of communication cable(s); and similarly, at the example shown in FIG. 13, is also possible to incorporate projector A within the electronic equipment.

Moreover, the present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are, moreover, within the scope of the present invention.

What is claimed is:

1. A projector optical system configuration employing one or more light sources, the projector optical system configuration comprising:
   at least one LED plane light source formed such that a plurality of LED cells are arrayed in two dimensions;
   at least one first lens array
      which is disposed on at least one side of the at least one LED plane light source from which light exits,
      which comprises a plurality of first lens members arrayed so as to individually oppose at least a portion of the respective LED cells, and
      which by action of at least a portion of the respective first lens members separately collects light irradiated from at least a portion of the respective LED cells of the at least one LED plane light source; and
   at least one second lens array
      which is disposed on at least one side of the at least one first lens array from which light exits,
      which comprises a plurality of second lens members arrayed so as to individually oppose at least a portion of the respective first lens members of the at least one first lens array,
      which by action of at least a portion of the respective second lens members separately magnifies light received from at least a portion of the at least one first lens array, and
      which causes at least a portion of light exiting at least a portion of the respective second lens members to be combined in mutually superposed fashion at at least one irradiation surface, wherein:
   at least a portion of the respective lens members of the at least one first lens array and the at least one second lens array are made up of lens cells comprising one or more clusters of one or more lenslets;
   at the at least one first lens array, respective first lenslets making up at least a portion of the lens cells separately collect light irradiated from at least a portion of the respective LED cells of the at least one LED plane light source;
   at the at least one second lens array, respective second lenslets making up at least a portion of the lens cells separately magnify light received from at least a portion of the first lenslets of the at least one first lens array; and
   at least a portion of light exiting at least a portion of the second lenslets is combined in mutually superposed fashion at the at least one irradiation surface, and wherein:
   within each of the lens cells the respective lenslets therein are mutually substantially nonuniform in size, but across the respective lens cells at least one mode of subdivision is mutually substantially identical; and
   between mutually opposing lens cells of the at least one first lens array and lens cells of the at least one second lens array, the at least one mode of subdivision is mutually substantially identical.

2. A projector optical system configuration employing one or more light sources, the projector optical system configuration comprising:
   at least one LED plane light source formed such that a plurality of LED cells are arrayed in two dimensions;
   at least one first lens array
      which is disposed on at least one side of the at least one LED plane light source from which light exits,
      which comprises a plurality of first lens members arrayed so as to individually oppose at least a portion of the respective LED cells, and
      which by action of at least a portion of the respective first lens members separately collects light irradiated from at least a portion of the respective LED cells of the at least one LED plane light source; and
   at least one second lens array
      which is disposed on at least one side of the at least one first lens array from which light exits,
      which comprises a plurality of second lens members arrayed so as to individually oppose at least a portion of the respective first lens members of the at least one first lens array,
      which by action of at least a portion of the respective second lens members separately magnifies light received from at least a portion of the at least one first lens array, and
      which causes at least a portion of light exiting at least a portion of the respective second lens members to be combined in mutually superposed fashion at at least one irradiation surface, wherein:
   at least a portion of the respective lens members of the at least one first lens array and the at least one second lens array are made up of lens cells comprising one or more clusters of one or more lenslets;
   at the at least one first lens array, respective first lenslets making up at least a portion of the lens cells separately collect light irradiated from at least a portion of the respective LED cells of the at least one LED plane light source;
   at the at least one second lens array, respective second lenslets making up at least a portion of the lens cells separately magnify light received from at least a portion of the first lenslets of the at least one first lens array; and
   at least a portion of light exiting at least a portion of the second lenslets is combined in mutually superposed fashion at the at least one irradiation surface, and wherein:
   within each of the lens cells the respective lenslets therein are mutually substantially nonuniform in size, but across the respective lens cells at least one mode of subdivision is mutually substantially different; and
   between mutually opposing lens cells of the at least one first lens array and lens cells of the at least one second lens array, the at least one mode of subdivision is mutually substantially identical.

3. A projector optical system configuration employing one or more light sources, the projector optical system configuration comprising:
   at least one LED plane light source formed such that a plurality of LED cells, each cell constituted by a reflector and an LED chip housed therein, are arrayed in two dimensions;
   at least one first lens array
      which is disposed on at least one side of the at least one LED plane light source from which light exits,
      which comprises a plurality of first lens members arrayed so as to individually oppose at least a portion of the respective LED cells, and
      which by action of at least a portion of the respective first lens members separately collects light irradiated from at least a portion of the respective LED cells of the at least one LED plane light source; and
   at least one second lens array which is disposed on at least one side of the at least one first lens array from which light exits, which comprises a plurality of second lens members arrayed so as to individually oppose at least a portion of the respective first lens members of the at least one first lens array, which by action of at least a portion of the respective second lens members separately magnifies light received from at least a portion of the at least one first lens array, and which causes at least a portion of light exiting at least a portion of the respective second lens members to be combined in mutually superposed fashion at at least one irradiation surface, wherein:

at least a portion of the respective lens members of the at least one first lens array and the at least one second lens array are made up of lens cells comprising one or more clusters of one or more lenslets;

at the at least one first lens array, respective first lenslets making up at least a portion of the lens cells separately collect light irradiated from at least a portion of the respective LED cells of the at least one LED plane light source;

at the at least one second lens array, respective second lenslets making up at least a portion of the lens cells separately magnify light received from at least a portion of the first lenslets of the at least one first lens array; and at least a portion of light exiting at least a portion of the second lenslets is combined in mutually superposed fashion at the at least one irradiation surface, and wherein:

within each of the lens cells the respective lenslets therein are mutually substantially nonuniform in size, but across the respective lens cells at least one mode of subdivision is mutually substantially identical; and between mutually opposing lens cells of the at least one first lens array and lens cells of the at least one second lens array, the at least one mode of subdivision is mutually substantially identical.

4. A projector optical system configuration employing one or more light sources, the projector optical system configuration comprising:

at least one LED plane light source formed such that a plurality of LED cells, each cell constituted by a reflector and an LED chip housed therein, are arrayed in two dimensions;

at least one first lens array which is disposed on at least one side of the at least one LED plane light source from which light exits, which comprises a plurality of first lens members arrayed so as to individually oppose at least a portion of the respective LED cells, and which by action of at least a portion of the respective first lens members separately collects light irradiated from at least a portion of the respective LED cells of the at least one LED plane light source; and at least one second lens array which is disposed on at least one side of the at least one first lens array from which light exits, which comprises a plurality of second lens members arrayed so as to individually oppose at least a portion of the respective first lens members of the at least one first lens array, which by action of at least a portion of the respective second lens members separately magnifies light received from at least a portion of the at least one first lens array, and which causes at least a portion of light exiting at least a portion of the respective second lens members to be combined in mutually superposed fashion at at least one irradiation surface, wherein:

at least a portion of the respective lens members of the at least one first lens array and the at least one second lens array are made up of lens cells comprising one or more clusters of one or more lenslets;

at the at least one first lens array, respective first lenslets making up at least a portion of the lens cells separately collect light irradiated from at least a portion of the respective LED cells of the at least one LED plane light source;

at the at least one second lens array, respective second lenslets making up at least a portion of the lens cells separately magnify light received from at least a portion of the first lenslets of the at least one first lens array; and at least a portion of light exiting at least a portion of the second lenslets is combined in mutually superposed fashion at the at least one irradiation surface, and wherein:

within each of the lens cells the respective lenslets therein are mutually substantially nonuniform in size, but across the respective lens cells at least one mode of subdivision is mutually substantially different; and between mutually opposing lens cells of the at least one first lens array and lens cells of the at least one second lens array, the at least one mode of subdivision is mutually substantially identical.

5. A projector optical system configuration according to any one of claims 1 through 4, wherein the at least one first lens array is integrated with the at least one LED plane light source as a unit.

6. A projector optical system configuration according to any one of claims 1 through 4, wherein the at least one LED plane light source is such that pluralities of red, green, and blue LED cells are each respectively arrayed in two dimensions within the same plane.

7. A projector optical system configuration according to claim 6, wherein:

brightnesses of at least a portion of red, green, and blue LEDs are monitored by one or more photoelectric elements; and at least one white balance is adjusted by feeding back into one or more LED drive circuits at least one signal derived from the monitoring.

8. A projector optical system configuration according to claim 6, wherein at least a portion of the red, green, and blue LEDs are made to undergo timed lighting so as to permit one or more color images to be projected onto one or more image irradiation surfaces.

9. A projector optical system configuration according to claim 7, wherein:

brightnesses of at least a portion of red, green, and blue LEDs are controlled by adjusting one or more values of one or more currents flowing through one or more LEDs.

10. A projector optical system configuration according to claim 7, wherein:

at least a portion of the red, green, and blue LEDs are capable of undergoing timed lighting; and the at least one white balance is adjusted as a result of control of lit times of at least a portion of the red, green, and blue LEDs.

11. A projector having one or more optical system configurations according to any one of claims 1 through 4, the projector causing at least a portion of light exiting at least a portion of the second lens members of the second lens array to be combined in mutually superposed fashion at the at least one irradiation surface so as to project one or more images onto one or more image irradiation surfaces.

12. Electronic equipment incorporating therewithin or capable of being connected to one or more projectors according to claim 11, at least one image being projected from at least one of the projector or projectors toward at least one of the image irradiation surface or surfaces.

13. Electronic equipment according to claim 12, wherein the electronic equipment incorporating therewithin or capable of being connected to one or more projectors is at least one laptop-type personal computer.

14. Electronic equipment according to claim 12, wherein the electronic equipment incorporating therewithin or capable of being connected to one or more projectors is at least one mobile telephone.

15. Electronic equipment according to claim 12, wherein the electronic equipment incorporating therewithin or capable of being connected to one or more projectors is at least one handheld terminal device.

16. Electronic equipment according to claim 12, wherein the electronic equipment incorporating therewithin or capable of being connected to one or more projectors is at least one electronic game device.

17. A vehicle having one or more in-vehicle projectors according to claim 11 provided at at least one roof portion thereof, at least one image from at least one of the projector or projectors being projected toward at least one image irradiation surface installed within the vehicle.

18. A vehicle having one or more in-vehicle projectors according to claim 11 provided within at least one dashboard thereof, at least one image from at least one of the projector or projectors being projected toward at least one image irradiation surface installed within the vehicle.

19. A vehicle having one or more in-vehicle projectors according to claim 11 provided within the vehicle, at least one image from at least one of the projector or projectors being projected toward at least one translucent screen which is visible from outside the vehicle.

20. A projection system in which one or more projectors according to claim 11 is or are installed within one or more tents, at least one image from at least one of the projector or projectors being projected toward the fabric of at least one of the tent or tents and/or toward at least one screen provided in the fabric thereof.

21. A showcase at which one or more projectors according to claim 11 is or are installed and having at least one image irradiation surface onto which at least one image is projected from at least one of the projector or projectors.

22. A projector optical system configuration according to any one of claims 1 through 4, wherein:
the at least one LED plane light source is formed such that multiplicities of red LED cells emitting light at one or more red wavelengths, green LED cells emitting light at one or more green wavelengths, and blue LED cells emitting light at one or more blue wavelengths are each arrayed together on the same substrate;
the projector optical system configuration further comprises
at least one timed lighting control means for causing timed lighting operation such that LED cells emitting light of the same color are switched in mutually simultaneous fashion between lit and extinguished states; and
at least one image forming means for receiving light from lit LED cells and for forming one or more images in correspondence to at least one color of the light so received.

23. An optical module according to claim 22, wherein at least a portion of the respective LED cells are capable of being made to light by virtue of at least one power supply which is at least one species selected from among the group consisting of one or more household alternating-current power supplies, one or more secondary cells, and one or more car batteries.

24. A projector equipped with one or more optical modules according to claim 22, at least one image formed thereby being projected toward at least one of the image irradiation surface or surfaces.

25. A projector optical system configuration according to any one of claims 1 through 4, wherein the at least one LED plane light source includes:
at least one red LED plane light source formed such that a multiplicity of red LED cells emitting light at one or more red wavelengths are arrayed on at least one substrate;
at least one red image forming means for receiving light from the at least one red LED plane light source and for forming one or more images in correspondence to at least one red color;
at least one green LED plane light source formed such that a multiplicity of green LED cells emitting light at one or more green wavelengths are arrayed on at least one substrate;
at least one green image forming means for receiving light from the at least one green LED plane light source and for forming one or more images in correspondence to at least one green color;
at least one blue LED plane light source formed such that a multiplicity of blue LED cells emitting light at one or more blue wavelengths are arrayed on at least one substrate;
at least one blue image forming means for receiving light from the at least one blue LED plane light source and for forming one or more images in correspondence to at least one blue color; and the projector optical system configuration further comprises
at least one image combining means for combining, in mutually superposed fashion, images formed by the respective image forming means and for forming one or more projected images.

26. An optical module according to claim 25, wherein at least a portion of the respective LED cells are capable of being made to light by virtue of at least one power supply which is at least one species selected from among the group consisting of one or more household alternating-current power supplies, one or more secondary cells, and one or more car batteries.

27. A projector equipped with one or more optical modules according to claim 25, at least one image formed thereby being projected toward at least one of the image irradiation surface or surfaces.

* * * * *